(12) United States Patent
Tamura et al.

(10) Patent No.: US 8,658,320 B2
(45) Date of Patent: Feb. 25, 2014

(54) METHOD OF OPERATING A FUEL CELL

(75) Inventors: Yoshio Tamura, Hyogo (JP); Koichi Kusumura, Osaka (JP)

(73) Assignee: Panasonic Corporation, Osaka (JP)

( * ) Notice: Subject to any disclaimer, the term of this patent is extended or adjusted under 35 U.S.C. 154(b) by 20 days.

(21) Appl. No.: 13/265,491

(22) PCT Filed: May 10, 2010

(86) PCT No.: PCT/JP2010/003170
§ 371 (c)(1),
(2), (4) Date: Oct. 20, 2011

(87) PCT Pub. No.: WO2010/128600
PCT Pub. Date: Nov. 11, 2010

(65) Prior Publication Data
US 2012/0034537 A1    Feb. 9, 2012

(30) Foreign Application Priority Data

May 8, 2009  (JP) ................................ 2009-113239

(51) Int. Cl.
*H01M 8/06*       (2006.01)
(52) U.S. Cl.
USPC ........................................................ 429/410
(58) Field of Classification Search
USPC ........................................................ 429/410
See application file for complete search history.

(56) References Cited

U.S. PATENT DOCUMENTS

| 6,727,013 | B2 * | 4/2004 | Wheat et al. | 429/442 |
| 2002/0146602 | A1 | 10/2002 | Abe et al. | |
| 2003/0012989 | A1 | 1/2003 | Ueda et al. | |
| 2004/0106026 | A1 * | 6/2004 | Fujita et al. | 429/24 |
| 2005/0158597 | A1 * | 7/2005 | Saitou | 429/22 |
| 2008/0038603 | A1 * | 2/2008 | Lee et al. | 429/22 |
| 2008/0075992 | A1 | 3/2008 | Fujita et al. | |
| 2008/0220303 | A1 * | 9/2008 | Yoshida | 429/25 |
| 2009/0092883 | A1 * | 4/2009 | Ozeki et al. | 429/34 |

FOREIGN PATENT DOCUMENTS

| JP | 2003-229156 | | 8/2003 | |
| JP | 2003229156 | * | 8/2003 | ............ H01M 8/04 |
| JP | 2004-307236 | | 11/2004 | |
| JP | 2005-005213 | | 1/2005 | |
| JP | 2006-092789 | | 4/2006 | |
| JP | 2006-134647 | | 5/2006 | |
| JP | 2007-134063 | | 5/2007 | |
| JP | 2008-108446 | | 5/2008 | |

OTHER PUBLICATIONS

Machine English Translation of JP 2003-229156 to Abe et al.*

* cited by examiner

*Primary Examiner* — Carlos Barcena
*Assistant Examiner* — Michael Dignan
(74) *Attorney, Agent, or Firm* — McDermott Will & Emery

(57) ABSTRACT

A fuel cell system according to the present invention includes: a deodorizing device (20) configured to remove an odor component contained in a raw material gas; a reformer (32) configured to generate a hydrogen-containing gas through reforming reaction using the raw material gas that is discharged from the deodorizing device; a fuel cell (1) configured to generate power by using the hydrogen-containing gas that is discharged from the reformer; at least one on-off valve (21*a*, 21*b*, 3*a*, 3*b*, 28, 29) provided on the combustible gas passage which is downstream from the deodorizing device and which extends through the reformer; and a stuck-state checker (13, 18, 7) configured to perform a stuck-state check on the on-off valve by supplying the raw material gas to the combustible gas passage.

7 Claims, 10 Drawing Sheets

METHOD OF OPERATING A FUEL CELL

RELATED APPLICATIONS

This application is the U.S. National Phase under 35 U.S.C. §371 of International Application No. PCT/JP2010/003170, filed on May 10, 2010, which in turn claims the benefit of Japanese Application No. 2009-113239, filed on May 8, 2009, the disclosures of which applications are incorporated by reference herein.

TECHNICAL FIELD

The present invention relates to a fuel cell system configured to perform a leak check on a fuel gas passage.

BACKGROUND ART

Conventionally, there are proposed fuel cell systems which perform a leak check on a combustible gas passage (see Patent Literature 1, for example).

CITATION LIST

Patent Literature

PTL 1: Japanese Laid-Open Patent Application Publication No. 2008-108446 (Abstract)

SUMMARY OF INVENTION

Technical Problem

However, the conventional art, which takes gas leakage into consideration, does not consider abnormalities where on-off valves become stuck. In particular, since the steam concentration in a combustible gas in fuel cell systems is higher than in other gas apparatuses, there is a high possibility in such fuel cell systems that their on-off valves become stuck and unable to open due to condensation water (i.e., valve stuck closed)

The present invention solves the above conventional problems. An object of the present invention is to provide a fuel cell system which is capable of checking whether the on-off valves are stuck closed, without additionally requiring test gas supply equipment.

Solution to Problem

As a result of diligent studies regarding the above problems, the present inventors have obtained findings as follows: steam that flows back from a reformer is adsorbed (trapped) by a deodorizing device which is configured to remove odor components from a raw material gas, and therefore, on-off valves provided on a combustible gas passage, which is downstream from the deodorizing device and which extends through the reformer, tend to become stuck closed.

In order to solve the above conventional problems, a fuel cell system according to the present invention includes: a deodorizing device configured to remove an odor component contained in a raw material gas; a reformer configured to generate a hydrogen-containing gas through a reforming reaction using the raw material gas that has passed through the deodorizing device; a fuel cell configured to generate power by using the hydrogen-containing gas that is discharged from the reformer; at least one on-off valve provided on a combustible gas passage which is downstream from the deodorizing device and which extends through the reformer; and a stuck-state checker configured to perform a stuck-state check on the on-off valve by supplying the raw material gas to the combustible gas passage.

The above object, other objects, features, and advantages of the present invention will be made clear by the following detailed description of preferred embodiments with reference to the accompanying drawings.

Advantageous Effects of Invention

The fuel cell system according to the present invention makes it possible to check, without additionally requiring test gas supply equipment, whether the on-off valve provided on the combustible gas passage, which is downstream from the deodorizing device and which extends through the reformer, is stuck closed.

DESCRIPTION OF EMBODIMENTS

Figure 1:
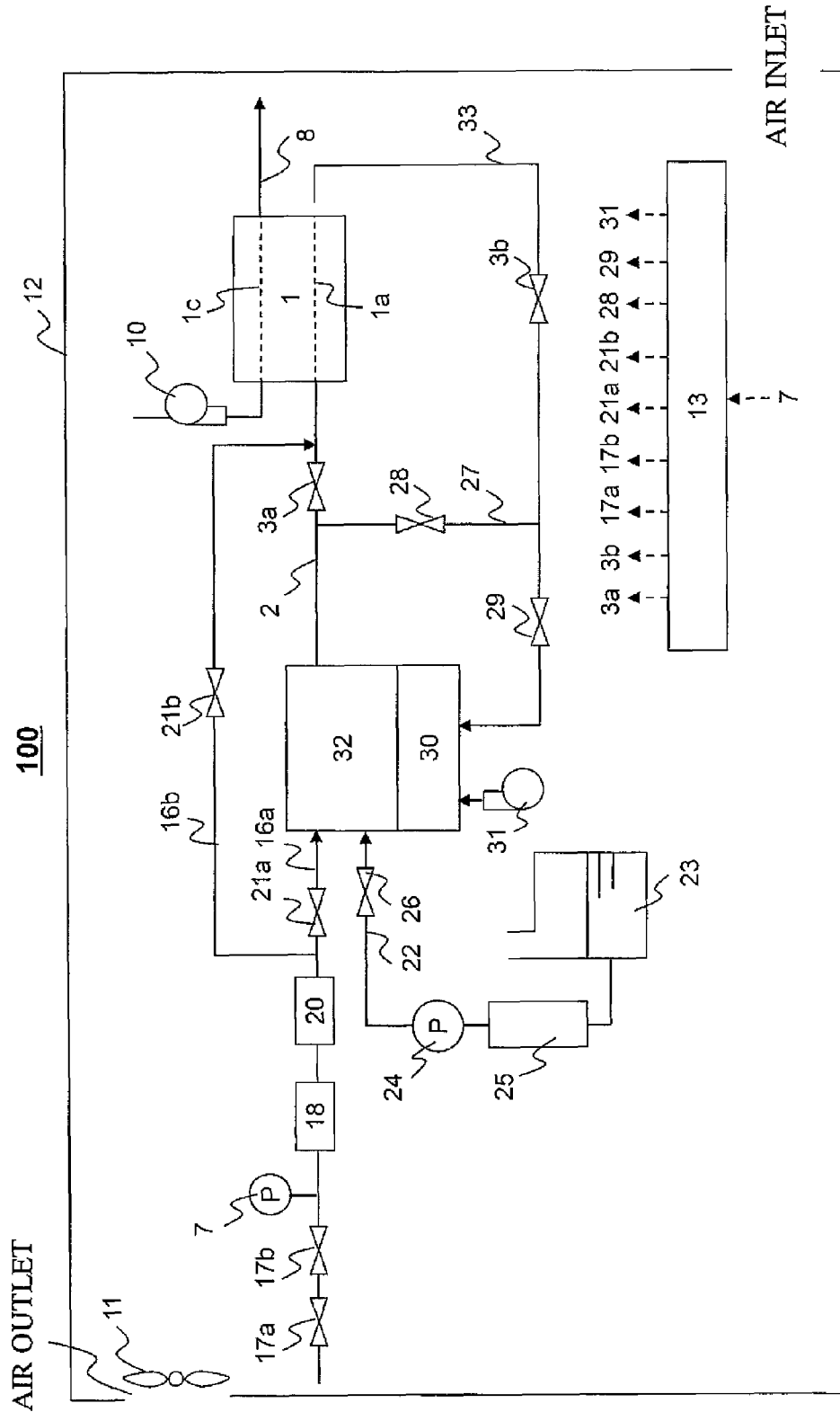
FIG. 1 is a block diagram showing an example of a schematic configuration of a fuel cell system according to Embodiment 1 of the present invention.

Hereinafter, preferred embodiments of the present invention are described with reference to the accompanying drawings.

A fuel cell system according to a first aspect includes: a deodorizing device configured to remove an odor component contained in a raw material gas; a reformer configured to generate a hydrogen-containing gas through a reforming reaction using the raw material gas that has passed through the deodorizing device; a fuel cell configured to generate power by using the hydrogen-containing gas that is discharged from the reformer; at least one on-off valve provided on a combustible gas passage which is downstream from the deodorizing device and which extends through the reformer;

and a stuck-state checker configured to perform a stuck-state check on the on-off valve by supplying the raw material gas to the combustible gas passage.

The above configuration makes it possible to check, without additionally requiring test gas supply equipment, whether the on-off valve provided on the combustible gas passage, which is downstream from the deodorizing device and which extends through the reformer, is stuck closed.

The "deodorizing device" refers to a device which includes an adsorbent for adsorbing and thereby removing an odor component contained in the raw material gas. Examples of the odor component include sulfur compounds such as hydrogen sulfide, thiophene, and sulfides, and nitrogen compounds such as amines and isonitriles.

The "combustible gas passage" includes a passage through which the raw material gas flows and a passage through which the hydrogen-containing gas flows.

The "stuck state of the on-off valve" is defined so as to include a state of being stuck closed where the on-off valve is in a closed state and unable to open.

The "stuck-state checker" is realized as a controller, for example. The stuck-state checker determines whether the on-off valve is in the stuck state, and also controls the operations of devices necessary for performing the stuck-state check.

A fuel cell system according to a second aspect is configured such that the fuel cell system according to the first aspect includes: a casing which accommodates therein at least the deodorizing device, the fuel cell, and the combustible gas passage; and a ventilator configured to ventilate the inside of the casing. The stuck-state checker is configured to operate the ventilator to ventilate the inside of the casing when performing the stuck-state check.

According to the above configuration, even if the combustible gas within the combustible gas passage leaks out of the combustible gas passage during the stuck-state check, the combustible gas is diluted and discharged to the outside of the casing by the ventilating operation of the ventilator. This is favorable in terms of safety.

A fuel cell system according to a third aspect is configured such that the fuel cell system according to the first or second aspect includes: a combustor connected to the combustible gas passage and configured to heat the reformer; and a combustion fan configured to supply air to the combustor. The stuck-state checker is configured to operate the combustion fan when performing the stuck-state check.

According to the above configuration, even if the combustible gas flows into the combustor from the combustible gas passage during the stuck-state check, the combustible gas is diluted and discharged owing to the air supplied by the combustion fan. This is favorable in terms of safety.

A fuel cell system according to a fourth aspect is configured such that, in the fuel cell system according to any one of the first to third aspects, the stuck-state checker includes a leak checker configured to perform a leak check on the combustible gas passage after the stuck-state check.

According to the above configuration, the operation advances to the leak check after it is confirmed through the stuck-state check that the raw material gas can be supplied to the combustible gas passage. In this manner, an abnormal leakage can be detected more assuredly.

To "perform a leak check on the combustible gas passage" is defined as performing at least a part of the leak check on the combustible gas passage. The "leak check on the combustible gas passage" includes at least one of the following checks: a check on gas leakage from the combustible gas passage; and a check on leakage from valves provided on the combustible gas passage.

The "leak checker" is realized as a controller, for example. The leak checker determines whether there is a leakage from the combustible gas passage, and controls the operations of devices necessary for performing the leak check.

A fuel cell system according to a fifth aspect is configured such that the fuel cell system according to the fourth aspect includes a pressure compensation operation prohibitor configured to prohibit a pressure compensation operation from being performed on the reformer if an abnormality is detected in at least one of the stuck-state check and the leak check.

The "pressure compensation operation prohibitor" is realized as a controller, for example. The pressure compensation operation prohibitor is configured to prevent the pressure compensation operation on the reformer from being started even if a pressure drop that requires the pressure compensation operation has occurred at the reformer.

In a case where an abnormality is detected through the stuck-state check, it is highly likely that pressure compensation for compensating for the pressure within a passage, of the combustible gas passage, that is downstream from the stuck-closed on-off valve cannot be achieved. In such a case, according to the above configuration, the pressure compensation operation is prevented from being wastefully performed, which is favorable. Moreover, in a case where an abnormality is detected through the leak check, the combustible gas may leak out of the combustible gas passage if the pressure compensation operation is performed. The above configuration reduces the occurrence of such leakage of the combustible gas. This is favorable in terms of safety.

A fuel cell system according to a sixth aspect is configured such that the fuel cell system according to any one of the first to third aspects includes a pressure compensation operation prohibitor configured to prohibit a pressure compensation operation from being performed on the reformer if an abnormality is detected in the stuck-state check.

In a case where an abnormality is detected through the stuck-state check, it is highly likely that pressure compensation for compensating for the pressure within a passage, of the combustible gas passage, that is downstream from the stuck-closed on-off valve cannot be achieved. In such a case, according to the above configuration, the pressure compensation operation is prevented from being wastefully performed, which is favorable.

A fuel cell system according to a seventh aspect is configured such that, in the fuel cell system according to any one of the first to sixth aspects, the combustible gas passage is configured to communicate with the atmosphere when the on-off valve is opened, and the stuck-state checker is configured to perform the stuck-state check after causing the combustible gas passage to communicate with the atmosphere by opening the on-off valve.

According to the above configuration, the internal pressure of the combustible gas passage is changed into the atmospheric pressure as initialization, and then the raw material gas is supplied to the combustible gas passage and the stuck-state check is performed. Therefore, erroneous detections of an abnormal stuck state are reduced as compared to a case where the stuck-state check is performed with the internal pressure of the combustible gas passage being different from the atmospheric pressure.

A fuel cell system according to an eighth aspect is configured such that, in the fuel cell system according to the seventh aspect, the stuck-state checker is configured to: close all of the on-off valves after causing the combustible gas passage to communicate with the atmosphere, and thereafter, sequentially open the on-off valves from an upstream on-off valve while supplying the raw material gas to the combustible gas passage; and perform the stuck-state check based on a pressure difference between before and after the most downstream on-off valve is opened.

According to the above configuration, a test gas is supplied in a manner to sequentially increase, by means of the supply pressure of the test gas, the pressures in respective enclosed spaces that are divided by multiple on-off valves. This reduces a possibility of occurrence of passage blockage due to water in a liquid form that exists in each enclosed space, as compared to a case where the multiple on-off valves are opened at the same time. This consequently reduces a possibility that passage blockage is erroneously determined to be an on-off valve being in the stuck state.

To "sequentially open the on-off valves from an upstream on-off valve" refers to sequentially opening the on-off valves from the upstream ones to the downstream ones. However, this does not necessarily mean opening all the on-off valves sequentially. Moreover, some on-off valves adjacent to each other may be opened at the same time.

A fuel cell system according to a ninth aspect is configured such that, in the fuel cell system according to the seventh aspect, the at least one on-off valve includes a first on-off valve which is provided upstream from the reformer and a second on-off valve which is provided downstream from the reformer, and the stuck-state checker is configured to open the second on-off valve prior to the first on-off valve when causing the combustible gas passage to communicate with the atmosphere.

According to the above configuration, if the internal pressure of the reformer is higher than the atmospheric pressure, the second on-off valve is opened before the first on-off valve is opened, and thereby the inside of the reformer is opened to the atmosphere. This reduces a possibility of occurrence of the following situation: when the first on-off valve is opened, steam within the reformer flows back to the raw material gas supply passage; and the steam that has flown back to the raw material gas supply passage condenses into water and causes passage blockage. This reduces a possibility that the supply of the raw material gas is hindered at the time of performing the stuck-state check.

A fuel cell system according to a tenth aspect is configured such that the fuel cell system according to the first to ninth aspects includes a combustor connected to the combustible gas passage and configured to heat the reformer. The combustible gas passage includes a first passage which extends through the reformer to the combustor while bypassing the fuel cell, and a second passage which extends through the reformer and the fuel cell to the combustor. The stuck-state checker is configured to perform the stuck-state check on the on-off valve that is provided on the second passage after performing the stuck-state check on the on-off valve that is provided on the first passage.

A fuel cell system operation method according to a first aspect is a method for operating a fuel cell system which includes: a deodorizing device configured to remove an odor component contained in a raw material gas; a reformer configured to generate a hydrogen-containing gas through a reforming reaction using the raw material gas that has passed through the deodorizing device; a fuel cell configured to generate power by using the hydrogen-containing gas that is discharged from the reformer; and at least one on-off valve provided on a combustible gas passage which is downstream from the deodorizing device and which extends through the reformer. The method includes performing a stuck-state check on the on-off valve by supplying the raw material gas to the combustible gas passage.

The above configuration makes it possible to check, without additionally requiring test gas supply equipment, whether the on-off valve provided on the combustible gas passage, which is downstream from the deodorizing device and which extends through the reformer, is stuck closed.

Hereinafter, specific exemplary embodiments of the present invention are described.

(Embodiment 1)

A fuel cell system according to Embodiment 1 is described below in detail.

[Configuration]

FIG. 1 is a block diagram showing an example of a schematic configuration of the fuel cell system according to Embodiment 1 of the present invention. As shown in FIG. 1, the fuel cell system of the present embodiment includes: a hydrogen generator 32 including a reformer 32a configured to generate a hydrogen-containing gas through a reforming reaction that uses a raw material gas and steam, and including an evaporator 32b configured to generate the steam for use in the reforming reaction; a fuel cell 1 configured to generate power by using the hydrogen-containing gas that is supplied from the hydrogen generator 32; an oxidizing gas supply device 10 configured to supply an oxidizing gas to the fuel cell 1; a combustor 30 configured to heat the reformer 32a by combusting the hydrogen-containing gas that is discharged from the fuel cell 1; and a casing 12 configured to accommodate these devices. Here, an air blower or the like is used as the oxidizing gas supply device 10, for example.

The fuel cell system according to the present embodiment further includes: a raw material gas supply device 18 configured to supply the raw material gas to the reformer 32a; a water supply device 24 configured to supply water to the evaporator 32b; and an air supply device 31 configured to supply combustion air to the combustor 30. Here, examples of the raw material gas supply device 18 include a pressure booster; examples of the water supply device 24 include a water pump; and examples of the air supply device 31 include a combustion fan.

The fuel cell system according to the present embodiment further includes: a raw material gas supply passage 16a through which the raw material gas supplied to the reformer 32a flows; a raw material gas branch passage 16b which bypasses the reformer 32a and which is configured to supply the raw material gas to an anode gas passage 1a of the fuel cell 1; a hydrogen gas supply passage 2 configured to supply the fuel cell 1 with the hydrogen-containing gas that is discharged from the hydrogen generator 32; the anode gas passage 1a through which the hydrogen-containing gas supplied to the fuel cell 1 flows; a cathode gas passage 1c through which the oxidizing gas supplied to the fuel cell 1 flows; an exhaust hydrogen gas passage 33 through which the hydrogen-containing gas that is discharged from the fuel cell 1 flows; a bypass passage 27 which is a branch passage of the hydrogen gas supply passage 2 and which is connected to the exhaust hydrogen gas passage 33 in a manner to bypass the fuel cell 1; an oxidizing gas passage 8 through which the oxidizing gas flows; and a water supply passage 22 configured to supply water to the evaporator 32b.

The raw material gas supply passage 16a is provided with a deodorizing device 20 which is configured to remove odor components contained in the raw material gas (e.g., sulfur compounds such as DMS and nitrogen compounds such as amines). The raw material gas supply passage 16a is connected to a raw material gas source (e.g., an infrastructure to supply the raw material gas, a raw material gas canister, or the like), of which the gas supply pressure is set to a predetermined pressure higher than the atmospheric pressure. The water supply passage 22 is provided with a purifier 25 for purifying the water supplied to the evaporator 32b, and is also provided with a water tank 23 as a water source.

The fuel cell system according to the present embodiment further includes: a raw material gas main valve 17a and a raw material gas main valve 17b which are provided on the raw material gas supply passage 16a at their respective positions upstream from the deodorizing device 20; a raw material gas supply valve 21a configured to both open and block a passage, of the raw material gas supply passage 16a, that is downstream from the deodorizing device 20; an anode inlet valve 3a configured to both open and block a passage, of the hydrogen gas supply passage 2, that is downstream from a branch point from which the bypass passage 27 extends; an anode outlet valve 3b configured to both open and block a passage, of the exhaust hydrogen gas passage 33, that is upstream from a merging point where the bypass passage 27 merges with the exhaust hydrogen gas passage 33; a bypass valve 28 configured to both open and block the bypass passage 27; a raw material gas supply valve 21b configured to both open and block the raw material gas branch passage 16b; a water supply valve 26 configured to both open and block the water supply passage 22; and a burner-front valve 29 configured to both open and block a passage, of the exhaust hydrogen gas passage 33, that is downstream from the merging point. It should be noted that the above valves are formed as solenoid on-off valves, for example.

A pressure detector 7 is provided on the raw material gas supply passage 16a at a position downstream from the raw material gas main valves 17a and 17b.

The fuel cell system according to the present embodiment further includes a controller 13 configured to control the operation of the fuel cell system. The controller 13 is configured to control at least the anode inlet valve 3a, the anode outlet valve 3b, the raw material gas main valves 17a and 17b, the raw material gas supply valves 21a and 21b, the bypass valve 28, the burner-front valve 29, and the air supply device 31. Moreover, the controller 13 is configured to perform a stuck-state check based on pressure values detected by the pressure detector 7 to check whether the above valves provided on a combustible gas passage, which is downstream from the deodorizing device 20 and which extends through the reformer 32a, are stuck.

Here, examples of the "combustible gas passage, which is downstream from the deodorizing device and which extends through the reformer" include a first passage and a second passage. The first passage includes: the raw material gas supply passage 16a from the deodorizing device 20 to the reformer 32a; the reformer 32a; the hydrogen gas supply passage 2 from the reformer 32a to the branch point from which the bypass passage 27 extends; the bypass passage 27; and the exhaust hydrogen gas passage 33 from the merging point, at which the bypass passage 27 merges with the exhaust hydrogen gas passage 33, to the combustor 30. The second passage includes: the raw material gas supply passage 16a from the deodorizing device 20 to the reformer 32a; the reformer 32a; the hydrogen gas supply passage 2 from the reformer 32a to the fuel cell 1; the fuel cell 1; and the exhaust hydrogen gas passage 33 from the fuel cell 1 to the combustor 30.

[Operations]

Described next is a series of operations performed for the stuck-state check which is a feature of the fuel cell system according to the present embodiment.

Figure 2A:
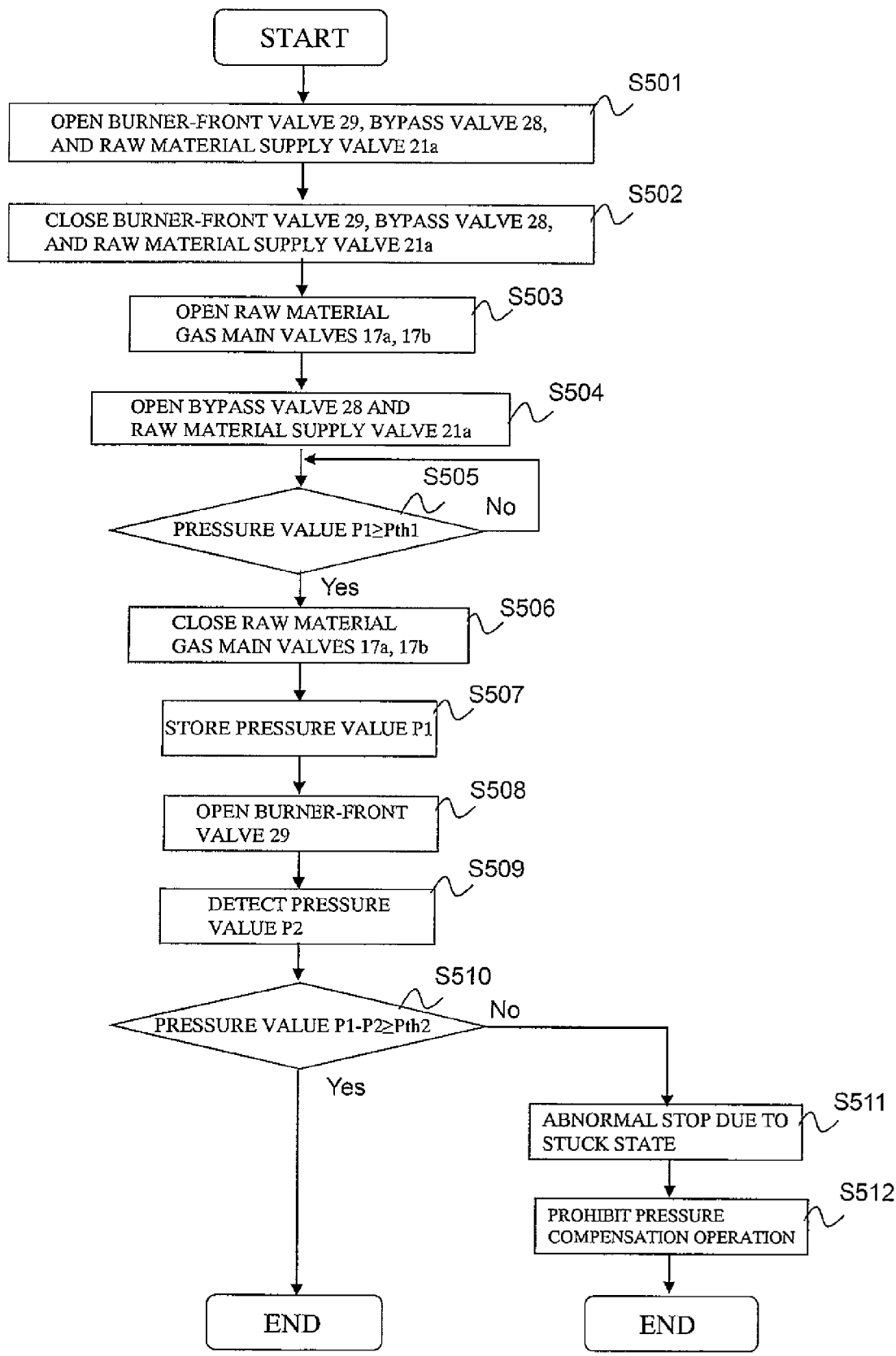
FIG. 2A is a flowchart showing an example of an operation program for the fuel cell system according to Embodiment 1 of the present invention.

FIG. 2A is a flowchart showing an example of a flow of operations which the fuel cell system according to Embodiment 1 of the present invention performs for the stuck-state check. These operations are performed by the controller 13 (the same is true for the other flowcharts described below).

First, the controller 13 outputs an instruction to start the stuck-state check (START). At this time, the raw material gas main valves 17a and 17b, the anode inlet valve 3a, the anode outlet valve 3b, and the raw material gas supply valve 21b are in a closed state. The controller 13 opens the burner-front valve 29, the bypass valve 28, and the raw material gas supply valve 21a, so that the first passage becomes open to the atmosphere (step S501).

Thereafter, the controller 13 closes the burner-front valve 29, the bypass valve 28, and the raw material gas supply valve 21a (step S502), and opens the raw material gas main valves 17a and 17b (step S503).

Subsequently, the controller 13 opens the raw material gas supply valve 21a and the bypass valve 28 (step S504) to supply the raw material gas to the first passage, and detects a pressure value P1 indicative of the pressure within the raw material gas supply passage 16a by means of the pressure detector 7.

When the pressure value P1 becomes greater than or equal to a first pressure threshold Pth1 (Yes in step S505), the controller 13 determines that the raw material gas has been injected into the first passage properly, and then closes the raw material gas main valves 17a and 17b (step S506). Consequently, the raw material gas is sealed in a passage, of the first passage, that is upstream from the most downstream closed on-off valve (the burner-front valve 29). The first pressure threshold Ph1 herein is set as a value that is greater than the atmospheric pressure but less than or equal to a supply pressure for supplying the raw material gas to the first passage. The controller 13 stores, into its internal memory (not shown), the pressure value P1 that is detected by the pressure detector 7 at a time when it is determined Yes in step S505 (step S507).

Subsequently, the controller 13 opens the burner-front valve 29 (step S508), so that the first passage becomes open to the atmosphere. When a first predetermined period (e.g., 30 seconds) has elapsed thereafter, the controller 13 obtains a pressure value P2 indicative of the pressure within the raw material gas supply passage 16a by means of the pressure detector 7 (step S509). Then, the controller 13 determines whether the difference of the pressure value P2 from the pressure value P1 (i.e., P1−P2) is greater than or equal to a second pressure threshold Pth2 (step S510). If the pressure difference (P1−P2) is less than the second pressure threshold Pth2 (No in step S510), it is estimated that the raw material gas is currently undischargeable through the first passage, and that at least one of the on-off valves provided on the first passage (in the present embodiment, the burner-front valve 29, the bypass valve 28, and the raw material gas supply valve 21a) is stuck closed. In this case, the controller 13 determines that there is occurring an abnormal stuck state of at least one on-off valve provided on the first passage. Then, the controller 13 gives an abnormal stuck state warning, and brings the fuel cell system to an abnormal stop (step S511). Also, the controller 13 prohibits a pressure compensation operation from being performed on the reformer 32a thereafter (step S512), and ends the stuck-state check on the first passage (END). The second pressure threshold Pth2 herein is set as a value that is greater than 0 but less than or equal to the pressure difference between the atmospheric pressure and the supply pressure for supplying the raw material gas to the first passage in steps S503 to S506.

If the pressure difference (P1–P2) is greater than or equal to the second pressure threshold Pth2 (Yes in step S510), this means that the raw material gas sealed in the first passage in steps S503 to S506 has been discharged to the atmosphere, and it is estimated that all of the on-off valves provided on the first passage have been opened. Here, the controller 13 determines that there is no abnormal stuck state, and ends the stuck-state check (END).

The "pressure compensation operation" herein refers to an operation that is performed when the internal pressure of the reformer 32a decreases due to a temperature decrease. In the pressure compensation operation, the communication of the reformer 32a with the atmosphere is blocked, and in such a state, the on-off valves provided on the raw material gas supply passage 16a are opened and thereby the raw material gas is supplied to compensate for at least a part of the decrease in the internal pressure of the reformer 32a. Here, the decrease in the internal pressure is detected by a detector (not shown) which is configured to directly or indirectly detect the pressure within the reformer 32a. If the detector detects a pressure decrease for which the pressure compensation operation is necessary, then the controller 13 opens the aforementioned on-off valves, thereby supplying the raw material gas to the reformer 32a. At the time of performing the pressure compensation operation, not only are the on-off valves opened, but the raw material gas supply device 18 (pressure booster) may be operated. Examples of the detector configured to directly detect the pressure within the reformer 32a include a pressure detector. Also, examples of the detector configured to indirectly detect the pressure within the reformer 32a include: a temperature detector which detects the temperature of the reformer 32a; and a timekeeper which measures a time elapsed since the stop of the hydrogen generation operation by the reformer 32a.

Accordingly, in a case where the pressure compensation operation is prohibited in step S512, even if the controller 13 detects a pressure decrease in the reformer 32a, the controller 13 does not start supplying the raw material gas to the reformer 32a by opening the on-off valves provided on the raw material gas supply passage 16a.

In the present embodiment, in a state where the burner-front valve 29, the anode inlet valve 3a, and the anode outlet valve 3b are closed, the raw material gas main valves 17a, 17b, and the raw material gas supply valve 21a, which are on-off valves provided on the raw material gas supply passage 16a, are opened, and thereby the raw material gas is supplied to the reformer 32a. This compensates for the decreased pressure at least partially.

The pressure compensation operation is not limited to the one described above. For example, in a state where the burner-front valve 29 and the anode outlet valve 3b are closed, not only the raw material gas main valves 17a, 17b, and the raw material gas supply valve 21a, which are the aforementioned on-off valves, but also the anode inlet valve 3a may be opened, and thereby pressure compensation may be performed on the reformer 32 and the anode gas passage 1a of the fuel cell 1 at the same time.

In the description herein, the on-off valves provided on the raw material gas supply passage 16a are realized as the raw material gas main valves 17a, 17b, and the raw material gas supply valve 21a. However, this is merely an example, and the present embodiment is not limited to this configuration. For example, it is not essential to include both of the raw material gas main valves 17a and 17b. Including either the raw material gas main valve 17a or 17b will suffice.

In step S501 in which the first passage is opened to the atmosphere, the valves may be opened at the same time. However, it is preferred that at least the burner-front valve 29 and the bypass valve 28, which are downstream from the raw material gas supply valve 21a, are opened before the raw material gas supply valve 21a is opened. In a case where the valves are opened in such a sequence, even if the internal pressure of the reformer 32 is higher than the atmospheric pressure, the internal pressure is released to the atmosphere via the downstream valves. This reduces a possibility of occurrence of the following situation: when the raw material gas supply valve 21a is opened, steam flows back to the raw material gas supply passage 16a; the steam that has flown back to the raw material gas supply passage 16a condenses into water and blocks the raw material gas supply passage 16a; and as a result, the supply of the raw material gas is hindered at the time of performing the stuck-state check. In particular, the raw material gas supply valve 21a is provided downstream from the deodorizing device 20, and therefore, it is expected that the life of the deodorizing device 20 is extended by performing the above-described control for suppressing the backflow of the steam.

In the description herein, the "first on-off valve", which is provided on the combustible gas passage and upstream from the reformer 32a, is realized as the raw material gas supply valve 21a. Also, the "second on-off valve", which is provided on the combustible gas passage and downstream from the reformer 32a, is realized as the burner-front valve 29 and the bypass valve 28. However, this is merely an example, and the present embodiment is not limited to this configuration. For example, in the fuel cell system that does not include the burner-front valve 29, the "second on-off valve" is realized as the bypass valve 28.

Preferably, in step S501, the burner-front valve 29 and the bypass valve 28 are also opened in the order of downstream one to upstream one (i.e., the burner-front valve 29 is opened prior to the bypass valve 28).

Furthermore, prior to step S501 in which the first passage is opened to the atmosphere, the raw material gas main valves 17a and 17b may be opened, and thereby pressure filling with the raw material gas may be performed on a passage, of the raw material gas supply passage 16a, that is upstream from the raw material supply valve 21a. At the time of opening the raw material gas supply valve 21a, if the passage, of the raw material gas supply passage 16a, that is upstream from the raw material gas supply valve 21a has a negative internal pressure, then the passage may suck in the steam present within the reformer 32 when the raw material gas supply valve 21a is opened. However, the aforementioned pressure filling alleviates the negative pressure within the passage, of the raw material gas supply passage 16a, that is upstream from the raw material supply valve 21a. As a result, the backflow of the steam is suppressed. This reduces a possibility of the raw material gas supply passage 16a being blocked due to condensation of the steam that has flown back, and a possibility of the steam entering the deodorizing device 20.

The stuck-state check described above checks whether the on-off valves provided on the first passage are stuck closed. In addition, the stuck-state check may check whether the on-off valve that is opened last (the burner-front valve 29) before a determination is provided regarding the abnormal stuck state (i.e., before step S510) is stuck opened. Specifically, a pressure value that is detected when a predetermined period has elapsed after step S506 may be stored as the pressure value P1 into the memory in step S507. It should be noted that a period that is necessary for the pressure within the first passage to become the same as the atmospheric pressure in a case of where there is an abnormal stuck opened state, is set as the predetermined period. For example, the predetermined period is set to 10 seconds.

Further, in the stuck-state check described above, the raw material gas main valves 17a and 17b are opened, which allows the raw material gas to be injected into the first passage from the raw material gas source of which the supply pressure is predetermined. However, as an alternative, the raw material gas supply device 18 (pressure booster) may be operated at the same time as the raw material gas main valves 17a and 17b are opened. In this manner, the raw material gas may be injected into the first passage with a higher pressure.

Still further, preferably, the stuck-state check by the fuel cell system of the present embodiment is performed at, at least, one of the following times: when the power generation by the fuel cell system is stopped; and when the fuel cell system is started up. Since the stuck-state check is performed by supplying the raw material gas to the reformer, it is particularly preferred that the stuck-state check is performed when the temperature of the reformer is at a level that does not cause carbon deposition from the raw material gas, and that the stuck-state check is performed at, at least, one of the following times: when the power generation by the fuel cell system is stopped; and when the fuel cell system is started up.

[Variation 1]

A fuel cell system according to Variation 1 of the present embodiment is configured to perform a leak check on the first passage, following the stuck-state check on the first passage according to Embodiment 1.

Figure 2B:
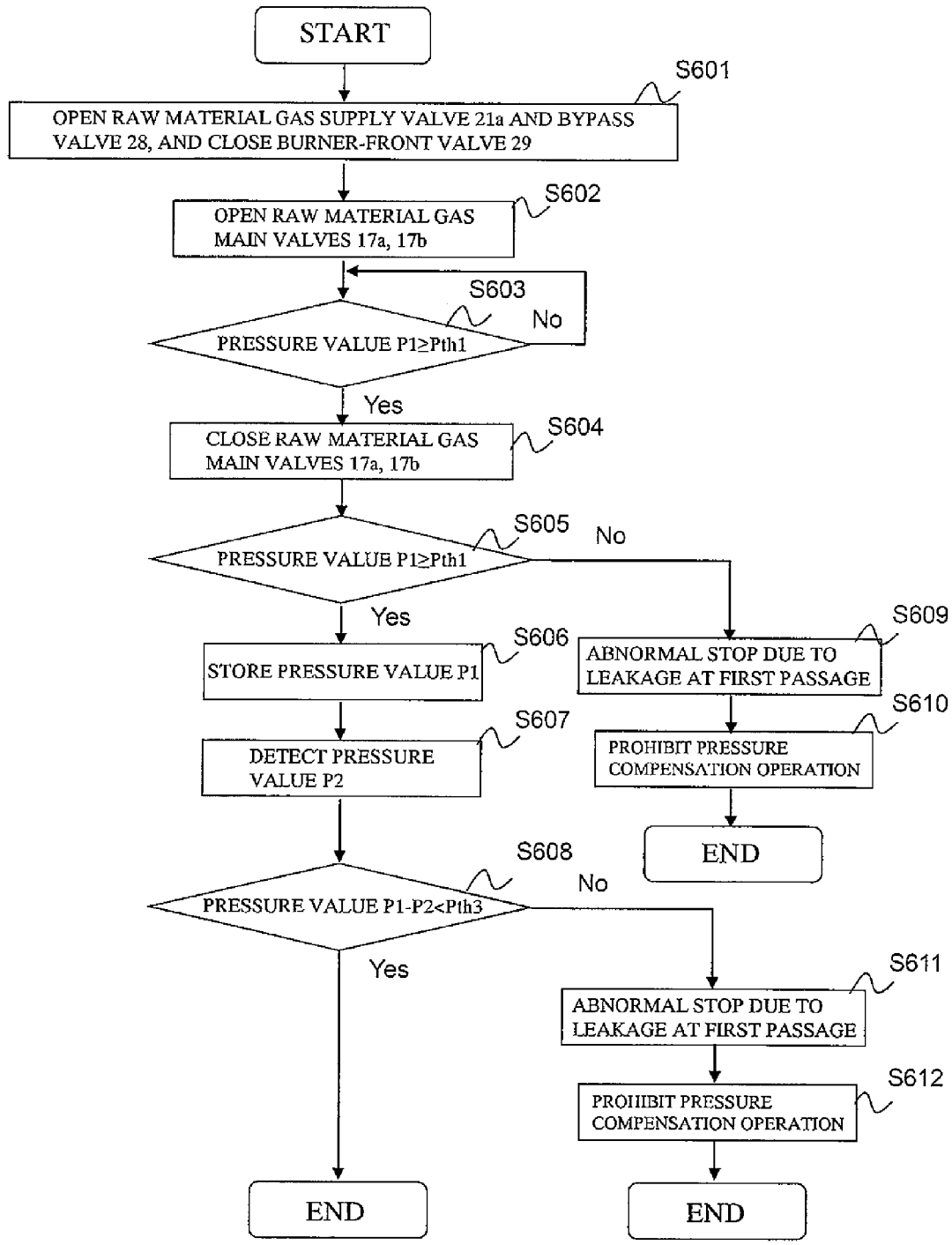
FIG. 2B is a flowchart showing an example of an operation program for a fuel cell system according to Variation 1 of Embodiment 1 of the present invention.

FIG. 2B is a flowchart showing an example of an operation program for the fuel cell system according to Variation 1 of Embodiment 1 of the present invention.

In Embodiment 1, the stuck-state check operation is ended if it is determined in step S510 that the pressure difference (P1−P2) is greater than or equal to Pth2. In Variation 1, a leak check on the first passage is performed following the stuck-state check. In this manner, the leak check is performed after it is confirmed that there is no abnormal stuck state of the on-off valves on the first passage and that the raw material gas can be supplied to the first passage. This improves the reliability of the leak check. Hereinafter, a flow of a series of operations performed for the leak check is described with reference to FIG. 2B.

If it is determined in step S510 that the pressure difference (P1−P2) is greater than or equal to Pth2 (Yes in step S510), the operation advances from the stuck-state check to the leak check (START). At this time, the raw material gas main valves 17a and 17b, the anode inlet valve 3a, the anode outlet valve 3b, and the raw material gas supply valve 21b are in a closed state. Here, the controller 13 controls the raw material gas supply valve 21a and the bypass valve 28 to open, and controls the burner-front valve 29 to close (step 601). Thereafter, the controller 13 opens the raw material gas main valves 17a and 17b (step S602). In this manner, space that needs injection of the raw material gas for the leak check on the first passage is formed in advance, and then the injection of the raw material gas is performed. As a result, wasteful consumption of the raw material gas for the injection is reduced. To be specific, if the sequence of steps S601 and S602 is reversed, the raw material gas supplied to the first passage reaches a passage downstream from the burner-front valve 29 during a period after step S602 is performed and before step S601 is performed. This results in wasteful consumption of the raw material gas. When the pressure value P1 detected by the pressure detector 7 becomes greater than or equal to the first pressure threshold Pth1 (Yes in step S603), the controller 13 closes the raw material gas main valves 17a and 17b (step S604).

When a second predetermined period (e.g., 6 seconds) shorter than the first predetermined period has elapsed thereafter, the controller 13 determines whether the pressure value P1 that is detected by the pressure detector 7 when the second predetermined period has elapsed is greater than or equal to the first pressure threshold Pth1 (step S605). If the pressure value P1 is greater than or equal to Pth1 (Yes in step S605), the pressure value P1 is stored into the memory (not shown) (step S606).

When the first predetermined period (e.g., 30 seconds) has elapsed thereafter, the controller 13 detects a pressure by means of the pressure detector 7 as the pressure value P2 (step S607), and determines whether the difference between P1 and P2 (P1−P2) is less than a third pressure threshold Pth3 (step S608). If the pressure difference (P1−P2) is less than the third pressure threshold Pth3 (Yes in step 608), the operation of the leak check on the first passage ends (END). The second pressure threshold Pth2 herein is set as a value that is greater than 0 but less than or equal to the pressure difference between the atmospheric pressure and the supply pressure for supplying the raw material gas to the first passage in steps S602 to S604.

It should be noted that if it is determined in step S605 that the pressure value P1 is less than the first pressure threshold Pth1, or if it is determined in step S608 that the pressure difference is greater than or equal to the third pressure threshold, the controller 13 determines that a leakage is occurring at the first passage. Then, the controller 13 gives an abnormal leakage warning regarding the first passage and brings the fuel cell system to an abnormal stop (step S609, S611). Also, the controller 13 prohibits the pressure compensation operation thereafter (step S610, S612), and ends the first passage leak check (END). This is because if the raw material gas is supplied as the pressure compensation operation in a case where there is a leakage at the first passage, the raw material gas may leak from the first passage, which is unfavorable in terms of safety.

The first predetermined period is a standby period before step S605 is performed, and the second predetermined period is a standby period before step S608 is performed. The second predetermined period is longer than the first predetermined period. This clearly indicates that a first leak check for detecting a relatively large amount of leakage is performed in steps S604 and 605, and a second leak check for detecting a relatively small amount of leakage is performed in steps S606 to S608.

The leak check on the first passage according to Variation 1 is performed after the stuck-state check according to Embodiment 1 is performed on the on-off valves provided on the first passage. However, as an alternative, the leak check on the first passage may be performed after a stuck-state check according to Variation 4, which will be described below, is performed on the on-off valves provided on the second passage. In other words, a leak check on the combustible gas passage, which is downstream from the deodorizing device and which extends through the reformer, may be performed after all of the stuck-state checks on the on-off valves provided on the combustible gas passage have been completed.

[Variation 2]

A fuel cell system according to Variation 2 of the present embodiment is configured to perform a leak check on the bypass valve 28 as a leak check on an on-off valve that is provided on the first passage at a position upstream from the most downstream on-off valve of the first passage. The leak check on the bypass valve 28 is performed following the leak check on the first passage according to Variation 1, which is performed on the passage upstream from the most downstream on-off valve (the burner-front valve). The leak check on the bypass valve 28 refers to a check to find out whether there is occurring an abnormal situation where the passage is not blocked even if an attempt to close the bypass valve 28 has been made and the passage upstream from the bypass valve 28 and the passage downstream from the bypass valve 28 communicate with each other (i.e., abnormal leakage of the bypass valve 28).

Figure 2C:
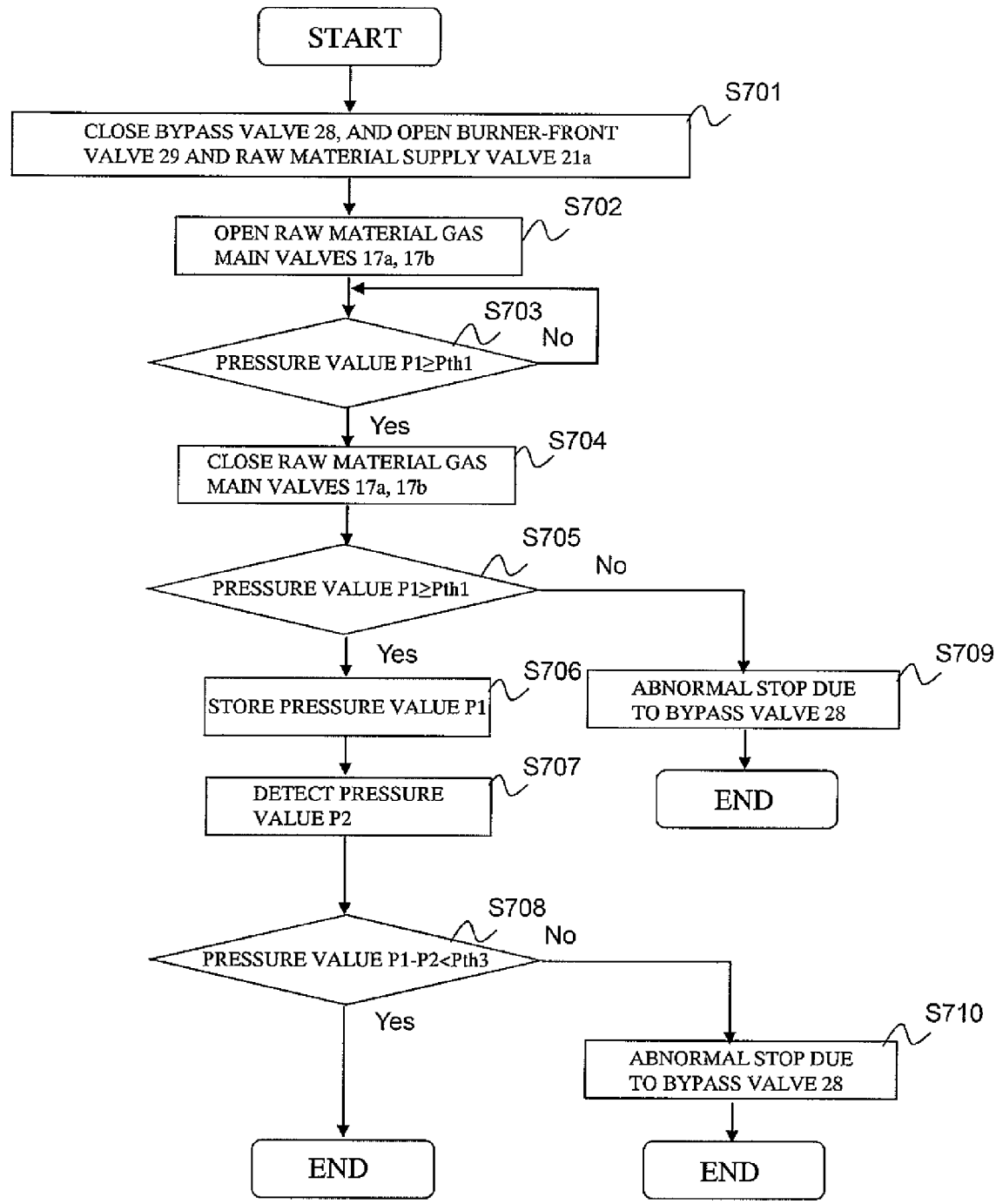
FIG. 2C is a flowchart showing an example of an operation program for a fuel cell system according to Variation 2 of Embodiment 1 of the present invention.

FIG. 2C is a flowchart showing an example of an operation program for the fuel cell system according to Variation 2 of Embodiment 1 of the present invention. Hereinafter, a flow of operations performed for the leak check on the bypass valve 28 is described with reference to FIG. 2C.

If it is determined in step S608 that the pressure difference (P1–P2) is less than Pth3 (Yes in step S608), the operation advances to the leak check on the bypass valve 28 (START). At this time, the raw material gas main valves 17a and 17b, the raw material gas supply valve 21b, the anode inlet valve 3a, and the anode outlet valve 3b are in a closed state. Here, the controller 13 controls the bypass valve 28 to close, and controls the burner-front valve 29 and the raw material gas supply valve 21a to open (step 701). Thereafter, the controller 13 opens the raw material gas main valves 17a and 17b (step S702). In this manner, space that needs injection of the raw material gas for the leak check on the bypass valve 28 is formed in advance, and then the injection of the raw material gas is performed. As a result, wasteful consumption of the raw material gas for the injection is reduced. To be specific, if the sequence of steps S701 and S702 is reversed, the injected raw material gas reaches a passage, of the first passage, that is positioned between the bypass valve 28 and the burner-front valve 29 during a period after step S702 is performed and before step S701 is performed. This results in wasteful consumption of the raw material gas.

Subsequently, when the pressure value P1 detected by the pressure detector 7 becomes greater than or equal to the first pressure threshold Pth1 (Yes in step S703), the controller 13 closes the raw material gas main valves 17a and 17b (step S704).

When the second predetermined period (e.g., 6 seconds) shorter than the first predetermined period has elapsed thereafter, the controller 13 determines whether the pressure value P1 that is detected by the pressure detector 7 when the second predetermined period has elapsed is greater than or equal to the first pressure threshold Pth1 (step S705). If the pressure value P1 is greater than or equal to Pth1 (Yes in step S705), the pressure value P1 is stored into the memory (not shown) (step S706).

When the first predetermined period (e.g., 30 seconds) has elapsed thereafter, the controller 13 detects the pressure value P2 by means of the pressure detector 7 (step S707), and determines whether the difference between P1 and P2 (P1–P2) is less than the third pressure threshold Pth3 (step S708). If the pressure difference (P1–P2) is less than the third pressure threshold Pth3 (Yes in step S708), the leak check on the bypass valve 28 ends (END).

It should be noted that if it is determined in step S705 that the pressure value P1 is less than the first pressure threshold Pth1, or if it is determined in step S708 that the pressure difference is greater than or equal to the third pressure threshold, the controller 13 determines that an abnormal leakage is occurring at the bypass valve 28. Then, the controller 13 gives an abnormal leakage warning regarding the bypass valve 28 and brings the fuel cell system to an abnormal stop (step S709, S710). However, the controller 13 does not prohibit the pressure compensation operation thereafter. That is, the pressure compensation operation is performed similarly to when there is no abnormality occurring (i.e., normal state) in the fuel cell system. This is because even if the pressure compensation operation is performed, the combustible raw material gas would not leak from the first passage since it has been confirmed through the leak check shown in FIG. 2B, which is performed prior to the leak check on the bypass valve 28, that there is no leakage from the first passage.

The first predetermined period is a standby period before step S705 is performed, and the second predetermined period is a standby period before step S708 is performed. The second predetermined period is longer than the first predetermined period. This clearly indicates that the first leak check for detecting a relatively large amount of leakage is performed in steps S704 and 705, and the second leak check for detecting a relatively small amount of leakage is performed in steps S706 to S708.

The leak check on the bypass valve 28 according to Variation 2 is performed after the leak check on the first passage according to Variation 1. However, as an alternative, the leak check on the bypass valve 28 may be performed after the stuck-state check according to Embodiment 1.

[Variation 3]

A fuel cell system according to Variation 3 of the present embodiment is configured to perform a leak check on the raw material gas supply valve 21a as a leak check on an on-off valve that is provided on the first passage at a position upstream from the most downstream on-off valve of the first passage. The leak check on the raw material gas supply valve 21a is performed following the leak check on the bypass valve 28 according to Variation 2 of Embodiment 1. The leak check on the raw material gas supply valve 21a refers to a check to find out whether there is occurring an abnormal situation where the passage is not blocked even if an attempt to close the raw material gas supply valve 21a has been made and the passage upstream from the raw material gas supply valve 21a and the passage downstream from the raw material gas supply valve 21a communicate with each other (i.e., abnormal leakage of the raw material gas supply valve 21a).

Figure 2D:
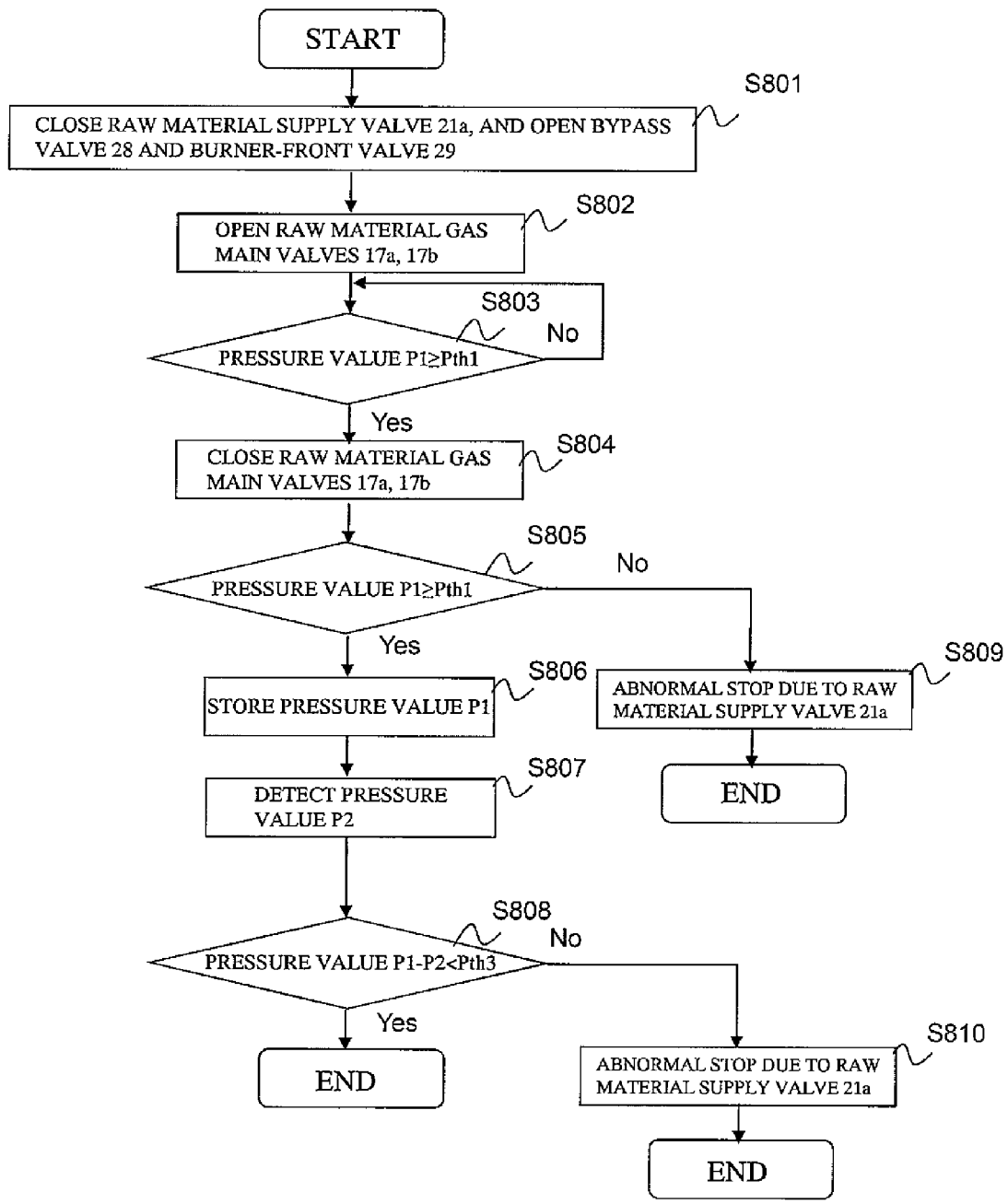
FIG. 2D is a flowchart showing an example of an operation program for a fuel cell system according to Variation 3 of Embodiment 1 of the present invention.

FIG. 2D is a flowchart showing an example of an operation program for the fuel cell system according to Variation 3 of Embodiment 1 of the present invention. Hereinafter, a flow of operations performed for the leak check on the raw material gas supply valve 21a is described with reference to FIG. 2D.

If it is determined in step S708 that the pressure difference (P1–P2) is less than Pth3 (Yes in step S708), the operation advances to the leak check on the raw material gas supply valve 21a (START). At this time, the raw material gas main valves 17a and 17b, the raw material gas supply valve 21b, the anode inlet valve 3a, and the anode outlet valve 3b are in a closed state. Here, the controller 13 controls the raw material gas supply valve 21a to close, and controls the bypass valve 28 and the burner-front valve 29 to open (step S801). Thereafter, the controller 13 opens the raw material gas main valves 17a and 17b (step S802). In this manner, space that needs injection of the raw material gas for the leak check on the raw material gas supply valve 21a is formed in advance, and then the injection of the raw material gas is performed. As a result, wasteful consumption of the raw material gas for the injection is reduced.

Subsequently, when the pressure value P1 detected by the pressure detector 7 becomes greater than or equal to the first pressure threshold Pth1 (Yes in step S803), the controller 13 closes the raw material gas main valves 17a and 17b (step S804).

When the second predetermined period (e.g., 6 seconds) shorter than the first predetermined period has elapsed thereafter, the controller 13 determines whether the pressure value P1 that is detected by the pressure detector 7 when the second predetermined period has elapsed is greater than or equal to the first pressure threshold Pth1 (step S805). If the pressure value P1 is greater than or equal to Pth1 (Yes in step S805), the pressure value P1 is stored into the memory (not shown). When the first predetermined period (e.g., 30 seconds) has elapsed thereafter, the controller 13 detects the pressure value P2 by means of the pressure detector 7, and determines whether the difference between the pressure values P1 and P2 (P1−P2) is less than the third pressure threshold Pth3. If the pressure difference (P1−P2) is less than the third pressure threshold Pth3 (Yes in step S808), the leak check on the raw material gas supply valve 21a ends.

It should be noted that if it is determined in step S805 that the pressure value P1 is less than the first pressure threshold Pth1, or if it is determined in step S808 that the pressure difference is greater than or equal to the third pressure threshold, the controller 13 determines that an abnormal leakage is occurring at the raw material gas supply valve 21a. Then, the controller 13 gives an abnormal leakage warning regarding the raw material gas supply valve 21a, brings the fuel cell system to an abnormal stop, and ends the leak check on the raw material gas supply valve 21a (step S809, S810). However, the controller 13 does not prohibit the pressure compensation operation thereafter. That is, the pressure compensation operation is performed similarly to when there is no abnormality occurring (i.e., normal state) in the fuel cell system. This is because even if the pressure compensation operation is performed, the combustible raw material gas would not leak from the first passage since it has been confirmed through the leak check shown in FIG. 2B, which is performed prior to the leak check on the raw material gas supply valve 21a, that there is no leakage from the first passage.

The first predetermined period is a standby period before step S805 is performed, and the second predetermined period is a standby period before step S808 is performed. The second predetermined period is longer than the first predetermined period. This clearly indicates that the first leak check for detecting a relatively large amount of leakage is performed in steps S804 and S805, and the second leak check for detecting a relatively small amount of leakage is performed in steps S806 to S808.

The leak check on the raw material gas supply valve 21a according to Variation 3 is not necessarily performed after the leak check on the bypass valve 28 according to Variation 2, but may be performed following the leak check on the first passage according to Embodiment 1 or following the leak check on the first passage according to Variation 1. Moreover, the leak check on the bypass valve 28 according to Variation 2 may be performed after the leak check on the raw material gas supply valve 21a according to Variation 3.

[Variation 4]

A fuel cell system according to Variation 4 of the present embodiment performs a stuck-state check on the on-off valves provided on the second passage, following the stuck-state check according to Embodiment 1 which is performed on the on-off valves provided on the first passage.

Figure 3A:
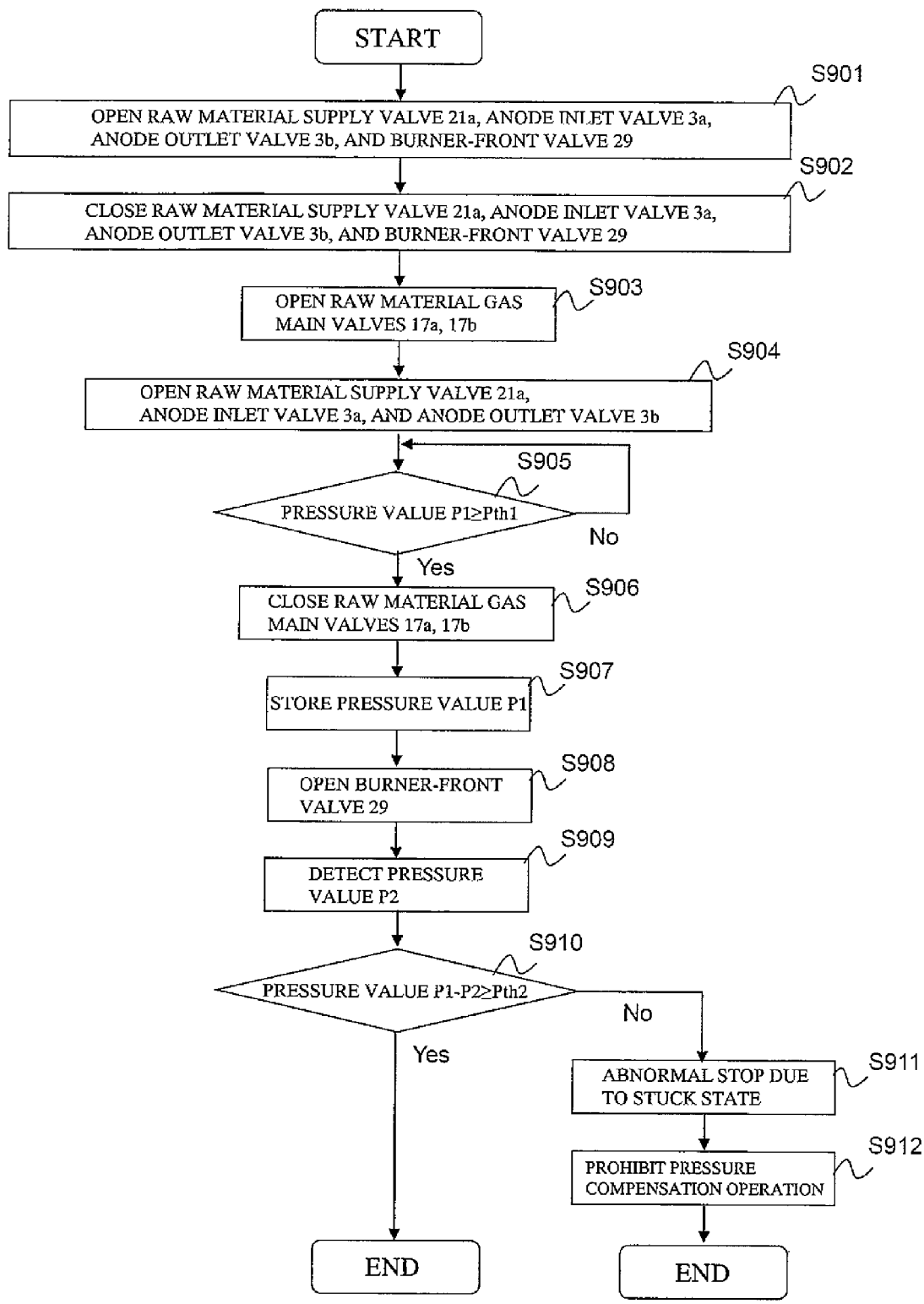
FIG. 3A is a flowchart showing an example of an operation program for a fuel cell system according to Variation 4 of Embodiment 1 of the present invention.

FIG. 3A is a flowchart showing an example of an operation program for the fuel cell system according to Variation 4 of Embodiment 1 of the present invention. Hereinafter, a flow of operations performed for the stuck-state check on the on-off valves provided on the second passage is described with reference to FIG. 3A.

If it is determined in step S510 that the pressure difference (P1−P2) is greater than or equal to Pth2 (Yes in step S510), the operation advances to the stuck-state check on the on-off valves provided on the second passage (START). At this time, the raw material gas main valves 17a and 17b, the bypass valve 28, and the raw material gas supply valve 21b are in a closed state. Here, the controller 13 controls the raw material gas supply valve 21a, the anode inlet valve 3a, the anode outlet valve 3b, and the burner-front valve 29 to open, so that the second passage becomes open to the atmosphere (step 901).

Thereafter, the controller 13 closes the raw material gas supply valve 21a, the anode inlet valve 3a, the anode outlet valve 3b, and the burner-front valve 29 (step S902), and opens the raw material gas main valves 17a and 17b (step S903).

Subsequently, the controller 13 opens the raw material gas supply valve 21a, the anode inlet valve 3a, and the anode outlet valve 3b (step S904), thereby supplying the raw material gas to the second passage, and detects the pressure value P1 indicative of the pressure within the raw material gas supply passage 16a by means of the pressure detector 7.

When the pressure value P1 becomes greater than or equal to the first pressure threshold Pth1 (Yes in step S905), the controller 13 determines that the raw material gas has been injected into the second passage properly, and then closes the raw material gas main valves 17a and 17b (step S906). Consequently, the raw material gas is sealed in a passage, of the second passage, that is upstream from the most downstream closed on-off valve (the burner-front valve 29). The controller 13 stores, into its internal memory (not shown), the pressure value P1 that is detected by the pressure detector 7 at a time when it is determined Yes in step S905 (step S907).

Subsequently, the controller 13 opens the burner-front valve 29 (step S908), so that the second passage becomes open to the atmosphere. When the first predetermined period (e.g., 30 seconds) has elapsed thereafter, the controller 13 obtains the pressure value P2 indicative of the pressure within the raw material gas supply passage 16a by means of the pressure detector 7. Then, the controller 13 determines whether the difference of the pressure value P2 from the pressure value P1 (i.e., P1−P2) is greater than or equal to the second pressure threshold Pth2 (step S910). If the pressure difference (P1−P2) is neither greater than nor equal to the second pressure threshold Pth2 (No in step S910), it is estimated that the raw material gas is currently undischargeable through the second passage, and that at least one of the on-off valves provided on the second passage (in the present embodiment, the burner-front valve 29, the anode inlet valve 3a, the anode outlet valve 3b, and the raw material gas supply valve 21a) is stuck closed. In this case, the controller 13 determines that there is occurring an abnormal stuck state of at least one on-off valve provided on the second passage. Then, the controller 13 gives an abnormal stuck state warning, and brings the fuel cell system to an abnormal stop (step S911). Also, the controller 13 prohibits the pressure compensation operation from being performed on the reformer 32 thereafter (step S912), and ends the operation of the stuck-state check on the second passage (END).

If the pressure difference (P1−P2) is greater than or equal to the second pressure threshold Pth2 (Yes in step S910), this means that the raw material gas sealed in the second passage in steps S903 to S906 has been discharged to the atmosphere, and it is estimated that all of the on-off valves provided on the second passage have been opened. Here, the controller 13 determines that there is no abnormal stuck state, and ends the stuck-state check (END).

In step S901 in which the second passage is opened to the atmosphere, the valves may be opened at the same time. However, it is preferred that at least the burner-front valve 29, the anode inlet valve 3a, and the anode outlet valve 3b, which are downstream from the raw material gas supply valve 21a, are opened before the raw material gas supply valve 21a is opened. In a case where the valves are opened in such a sequence, even if the internal pressure of the hydrogen generator 32 is higher than the atmospheric pressure, the internal pressure is released to the atmosphere via the downstream valves. This reduces a possibility of occurrence of the following situation: when the raw material gas supply valve 21a is opened, steam within the hydrogen generator 32 flows back to the raw material gas supply passage 16a; the steam that has flown back to the raw material gas supply passage 16a condenses into water and blocks the raw material gas supply passage 16a; and as a result, the supply of the raw material gas is hindered at the time of performing the stuck-state check. In particular, the raw material gas supply valve 21a is provided downstream from the deodorizing device 20, and therefore, it is expected that the life of the deodorizing device 20 is extended by performing the above-described control for suppressing the backflow of the steam.

In the description herein, the "first on-off valve", which is provided on the passage, of the combustible gas passage, that is upstream from the reformer 32a, is realized as the raw material gas supply valve 21a. Also, the "second on-off valve", which is provided on the passage, of the combustible gas passage, that is downstream from the reformer 32a, is realized as the burner-front valve 29, the anode outlet valve 3b, and the anode inlet valve 3a. However, this is merely an example, and the present embodiment is not limited to this configuration. For example, in the fuel cell system that does not include the burner-front valve 29, the "second on-off valve" is realized as the anode outlet valve 3b and the anode inlet valve 3a.

Moreover, preferably, in step S901, the burner-front valve 29, the anode inlet valve 3a, and the anode outlet valve 3b are opened in the order of downstream one to upstream one (i.e., in the order of burner-front valve 29, anode outlet valve 3b, and anode inlet valve 3a).

Similar to the pressure filling according to Embodiment 1 which is performed in the fuel cell system prior to step S501, the raw material gas main valves 17a and 17b may be opened prior to step S901 in which the second passage is opened to the atmosphere, and thereby pressure filling with the raw material gas may be performed on a passage, of the raw material gas supply passage 16a, that is upstream from the raw material supply valve 21a The stuck-state check according to Variation 4, which is performed on the on-off valves provided on the second passage, may be performed following any one of or a combination of: the leak check on the first passage according to Variation 1; the leak check on the bypass valve 28 according to Variation 2; and the leak check on the raw material supply valve 21a according to Variation 3.

[Variation 5]

A fuel cell system according to Variation 5 of the present embodiment is configured to perform a leak check on the anode inlet valve 3a, following the stuck-state check on the second passage according to Variation 4. In this manner, the leak check is performed after it is confirmed that there is no abnormal stuck state of the on-off valves on the second passage and that the raw material gas can be supplied to the second passage. This improves the reliability of the leak check. The leak check on the anode inlet valve 3a herein refers to a check to find out whether there is occurring an abnormal situation where the passage is not blocked even if an attempt to close the anode inlet valve 3a has been made and the passage upstream from the anode inlet valve 3a and the passage downstream from the anode inlet valve 3a communicate with each other (i.e., abnormal leakage of the anode inlet valve 3a).

Figure 3B:
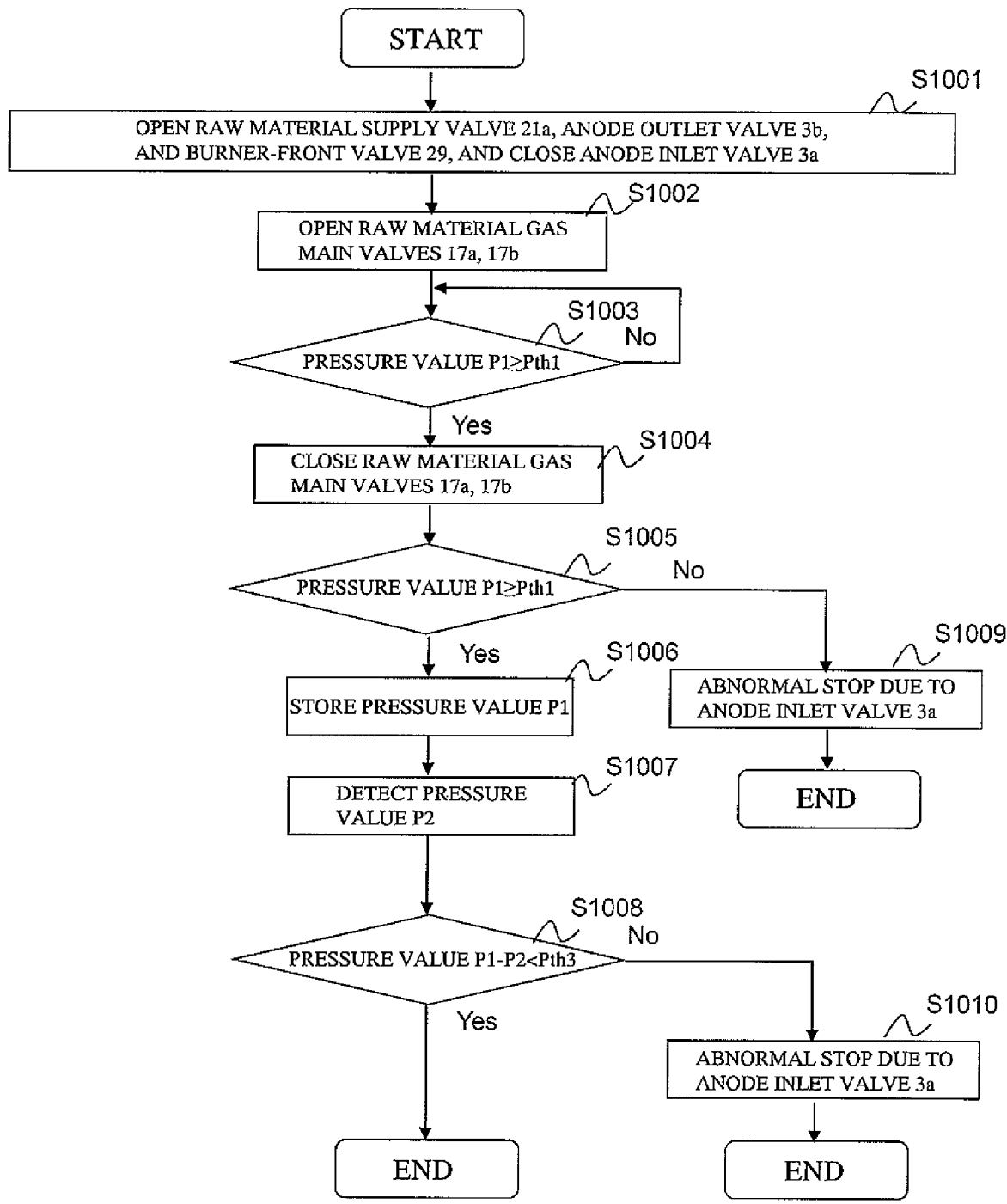
FIG. 3B is a flowchart showing an example of an operation program for a fuel cell system according to Variation 5 of Embodiment 1 of the present invention.

FIG. 3B is a flowchart showing an example of an operation program for the fuel cell system according to Variation 5 of Embodiment 1 of the present invention. Hereinafter, a flow of operations performed for the leak check on the anode inlet valve 3a is described with reference to FIG. 3B.

If it is determined in step S910 that the pressure difference (P1−P2) is greater than or equal to Pth2 (Yes in step S910), the operation advances to the leak check on the anode inlet valve 3a (START). At this time, the raw material gas main valves 17a and 17b, the bypass valve 28, and the raw material gas supply valve 21b are in a closed state. Here, the controller 13 controls the raw material gas supply valve 21a, the anode outlet valve 3b, and the burner-front valve 29 to open, and controls the anode inlet valve 3a to close (step S1001). Thereafter, the controller 13 opens the raw material gas main valves 17a and 17b (step S1002). In this manner, space that needs injection of the raw material gas for the leak check on the anode inlet valve 3a is formed in advance, and then the injection of the raw material gas is performed. As a result, wasteful consumption of the raw material gas for the injection is reduced.

Subsequently, when the pressure value P1 detected by the pressure detector 7 becomes greater than or equal to the first pressure threshold Pth1 (Yes in step S1003), the controller 13 closes the raw material gas main valves 17a and 17b (step S1004).

When the second predetermined period (e.g., 6 seconds) shorter than the first predetermined period has elapsed thereafter, the controller 13 determines whether the pressure value P1 that is detected by the pressure detector 7 when the second predetermined period has elapsed is greater than or equal to the first pressure threshold Pth1 (step S1005). If the pressure value P1 is greater than or equal to Pth1 (Yes in step S1005), the pressure value P1 is stored into the memory (not shown) (step S1006).

When the first predetermined period (e.g., 30 seconds) has elapsed thereafter, the controller 13 detects the pressure value P2 by means of the pressure detector 7 (step S1007), and determines whether the difference between P1 and P2 (P1−P2) is less than the third pressure threshold Pth3 (step S1008). If the pressure difference (P1−P2) is less than the third pressure threshold Pth3 (Yes in step S1008), the leak check on the anode inlet valve 3a ends (END).

It should be noted that if it is determined in step S1005 that the pressure value P1 is less than the first pressure threshold Pth1, or if it is determined in step S1008 that the pressure difference is greater than or equal to the third pressure threshold, the controller 13 determines that an abnormal leakage is occurring at the anode inlet valve 3a. Then, the controller 13 gives an abnormal leakage warning regarding the anode inlet valve 3a and brings the fuel cell system to an abnormal stop (step S1009, S1010), thereby ending the operation of checking an abnormal leakage regarding the anode inlet valve 3a (END).

The first predetermined period is a standby period before step S1005 is performed, and the second predetermined period is a standby period before step S1008 is performed. The second predetermined period is longer than the first predetermined period. This clearly indicates that the first leak check for detecting a relatively large amount of leakage is performed in steps S1004 and S1005, and the second leak check for detecting a relatively small amount of leakage is performed in steps S1006 to S1008.

[Variation 6]

Figure 3C:
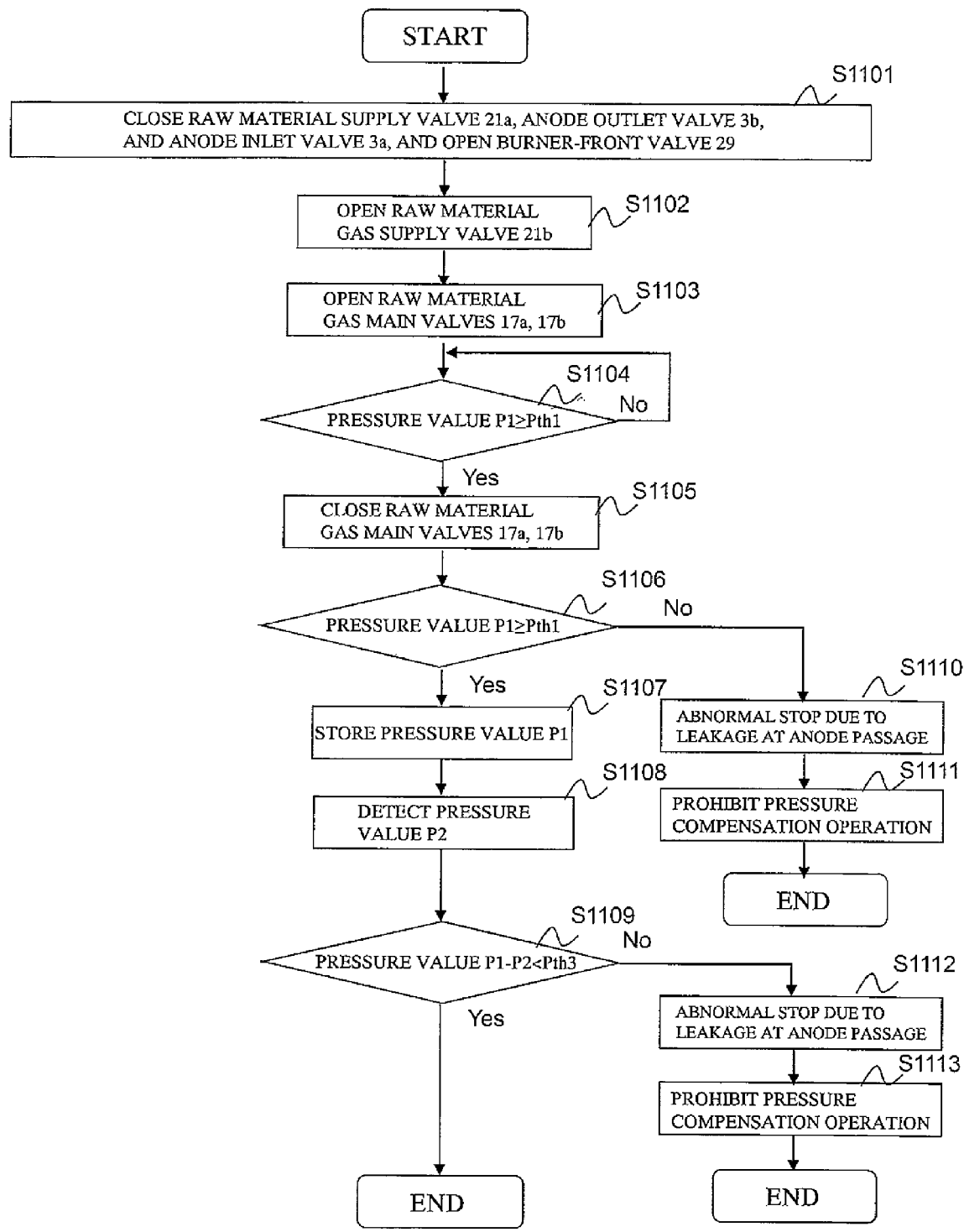
FIG. 3C is a flowchart showing an example of an operation program for a fuel cell system according to Variation 6 of Embodiment 1 of the present invention.

A fuel cell system according to Variation 6 of the present embodiment is configured to perform a leak check on a passage, of the second passage, that is positioned between the anode inlet valve 3a and the anode outlet valve 3b (hereinafter, simply referred to as a leak check on the second passage), following the leak check on the anode inlet valve 3a according to Variation 5. FIG. 3C is a flowchart showing an example of an operation program for the fuel cell system according to Variation 6 of Embodiment 1 of the present invention.

In Variation 5, the operation of the leak check on the anode inlet valve 3a is ended if it is determined in step S1008 that the pressure difference (P1−P2) is greater than or equal to Pth3. In Variation 6, the leak check on the second passage is performed following the determination (START). Hereinafter, a flow of a series of operations performed for the leak check on the anode passage is described with reference to FIG. 3C.

If it is determined in step S1008 that the pressure difference (P1−P2) is greater than or equal to Pth3, the operation advances to the leak check on the anode passage (START). At this time, the raw material gas main valves 17a and 17b, the bypass valve 28, and the raw material gas supply valve 21b are in a closed state. Here, the controller 13 controls the raw material supply valve 21a, the anode outlet valve 3b, and the anode inlet valve 3a to close, and controls the burner-front valve 29 to open (step S1101). Thereafter, the controller 13 opens the raw material gas supply valve 21b (step S1102), and opens the raw material gas main valves 17a and 17b (step S1103). In this manner, space that needs injection of the raw material gas for the leak check on the second passage is formed in advance, and then the injection of the raw material gas is performed. As a result, wasteful consumption of the raw material gas for the injection is reduced.

Subsequently, when the pressure value P1 detected by the pressure detector 7 becomes greater than or equal to the first pressure threshold Pth1 (Yes in step S1104), the controller 13 closes the raw material gas main valves 17a and 17b (step S1105).

When the second predetermined period (e.g., 6 seconds) shorter than the first predetermined period has elapsed thereafter, the controller 13 determines whether the pressure value P1 that is detected by the pressure detector 7 when the second predetermined period has elapsed is greater than or equal to the first pressure threshold Pth1 (step S1106). If P1 is greater than or equal to Pth1 (Yes in step S1106), the pressure value P1 is stored into the memory (not shown) (step S1107).

When the first predetermined period (e.g., 30 seconds) has elapsed thereafter, the controller 13 detects the pressure value P2 by means of the pressure detector 7 (step S1108), and determines whether the difference between P1 and P2 (P1−P2) is less than the third pressure threshold Pth3 (step S1109). If the pressure difference (P1−P2) is less than the third pressure threshold Pth3 (Yes in step S1109), the operation of the leak check on the second passage ends (END).

It should be noted that if it is determined in step S1107 that the pressure value P1 is less than the first pressure threshold Pth1, or if it is determined in step S1109 that the pressure difference is greater than or equal to the third pressure threshold, the controller 13 determines that a leakage is occurring at the second passage. Then, the controller 13 gives an abnormal leakage warning regarding the second passage and brings the fuel cell system to an abnormal stop (step S1110, S1112). Also, the controller 13 prohibits the pressure compensation operation thereafter (step S1111, S1113), and ends the operation of the leak check on the anode passage (END). This is because if the raw material gas is supplied for the pressure compensation operation in a case where there is a leakage at the second passage, the raw material gas may leak from the second passage, which is unfavorable in terms of safety.

The first predetermined period is a standby period before step S1106 is performed, and the second predetermined period is a standby period before step S1109 is performed. The second predetermined period is longer than the first predetermined period. This clearly indicates that the first leak check for detecting a relatively large amount of leakage is performed in steps S1105 and S1106, and the second leak check for detecting a relatively small amount of leakage is performed in steps S1107 to S1109.

In the leak check on the second passage, the raw material gas is injected into the second passage in steps S1102 to 1105 by bypassing the reformer 32a (i.e., through the raw material gas branch passage 16b). However, as an alternative, the raw material gas may be injected into the second passage through the reformer 32a. This is realized, for example, by opening the raw material gas main valves 17a, 17b, and the raw material gas supply valve 21a with the anode outlet valve 3b and the raw material gas supply valve 3b being closed.

Moreover, the pressure compensation operation may be performed on the second passage by supplying the raw material gas into the second passage in a manner to bypass the reformer 32a (i.e., through the raw material gas branch passage 16b). This is realized, for example, by opening the raw material gas main valves 17a, 17b, and the raw material gas supply valve 21b with the anode inlet valve 3a and the anode outlet valve 3b being closed. Furthermore, as a pressure compensation operation for the second passage, the raw material gas may be supplied to the second passage through the reformer 32a. This is realized, for example, by opening the raw material gas main valves 17a, 17b, and the raw material gas supply valve 21a with the anode outlet valve 3b and the raw material gas supply valve 3b being closed. The pressure compensation operation is performed on the second passage when the internal pressure of the fuel cell 1 decreases. The decrease in the internal pressure of the fuel cell 1 is detected by a detector (not shown) which is configured to directly or indirectly detect the pressure within the fuel cell 1a. Examples of the detector configured to directly detect the pressure within the fuel cell 1 include a pressure detector. Also, examples of the detector configured to indirectly detect the pressure within the fuel cell 1 include: a temperature detector which detects the temperature of the fuel cell 1; and a timekeeper which measures a time elapsed since the stop of the power generation by the fuel cell 1.

In a case where the pressure compensation operation is prohibited in step S1111, S1113, even if a decrease in the pressure of the fuel cell 1 is detected, the controller 13 does not open any on-off valves provided on the raw material gas supply passage 16a or 16b to start supplying the raw material gas to the fuel cell 1.

The leak check on the second passage according to Variation 6 is performed after the leak check on the anode inlet valve 3a according to Variation 5. However, as an alternative, the leak check on the second passage according to Variation 6 may be performed after the stuck-state check according to Variation 4 is performed on the on-off valves provided on the second passage. Moreover, the leak check on the anode inlet valve 3a according to Variation 5 may be performed after the leak check on the second passage according to Variation 6.

[Variation 7]

In the fuel cell systems according to Embodiment 1 and Variations thereof, it is preferred to perform abnormality detection a plurality of times if, in the checks described above with reference to FIGS. 2B to 2D and FIGS. 3A to 3C, an abnormal leakage is detected in the second leak check which checks a relatively small amount of leakage. This is because there is a relatively high probability of erroneous detections in a leak check that checks a small amount of leakage. Therefore, it is preferred that an occurrence of abnormality is confirmed after the abnormality is detected a plurality of times, and then the fuel cell system is brought to an abnormal stop.

(Embodiment 2)

Hereinafter, a fuel cell system according to Embodiment 2 is described in detail.

[Configuration]

Figure 4:
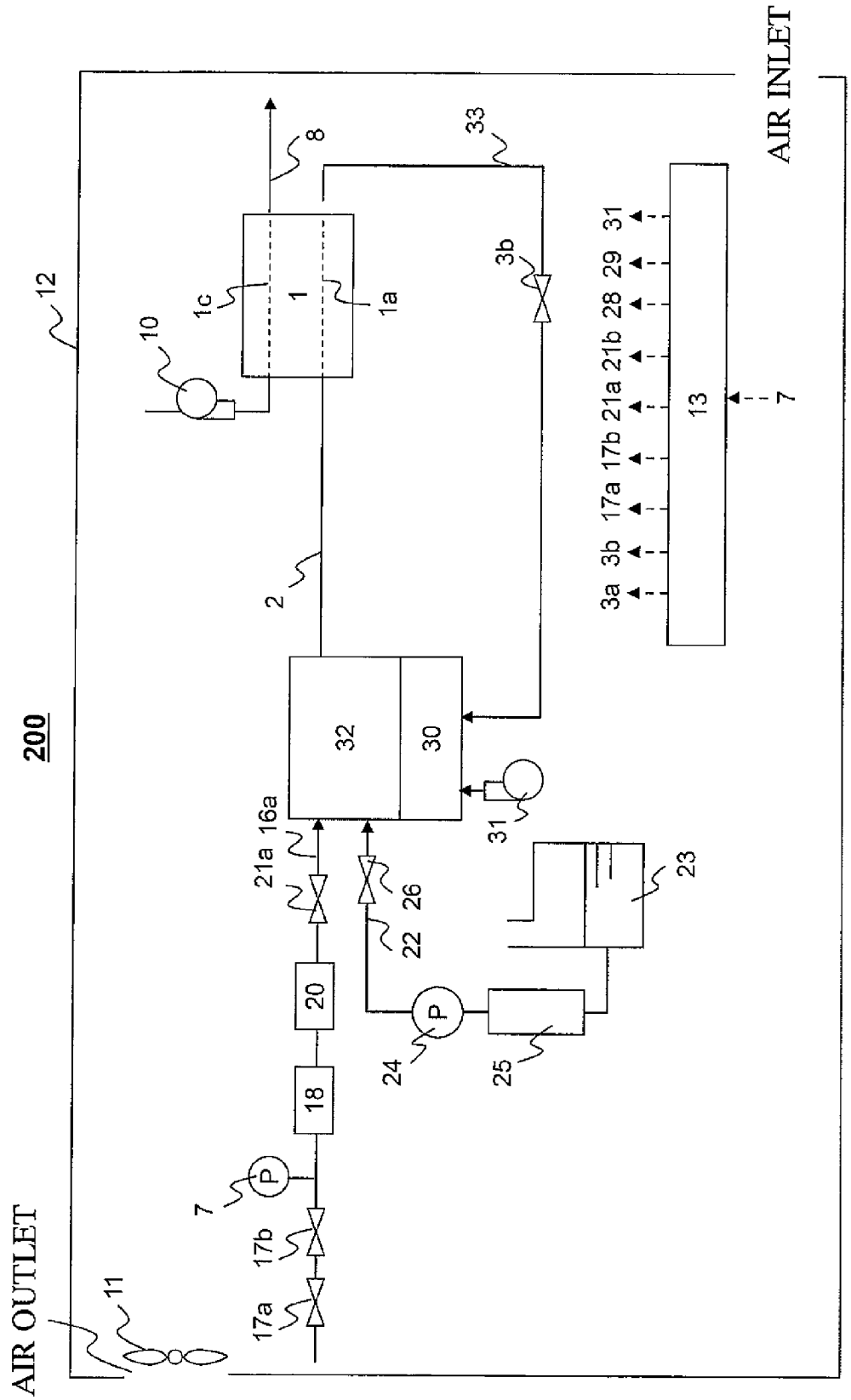
FIG. 4 is a block diagram showing an example of a schematic configuration of a fuel cell system according to Embodiment 2 of the present invention.

FIG. 4 is a block diagram showing an example of a schematic configuration of the fuel cell system according to Embodiment 2 of the present invention. A fuel cell system 200 according to the present embodiment is different from the fuel cell system 100 according to Embodiment 1 in that the fuel cell system 200 does not include the raw material gas branch passage 16b, the raw material gas supply valve 21b, the anode inlet valve 3a, the bypass passage 27, the bypass valve 28, and the burner-front valve 29. In the description of the fuel cell system 200 below, the same components as those of the fuel cell system 100 are denoted by the same reference signs and names as those used in the fuel cell system 100, and a detailed description of such components will be omitted.

[Operations]

Described next is a series of operations performed for a stuck-state check which is a feature of the fuel cell system according to the present embodiment.

Figure 5:
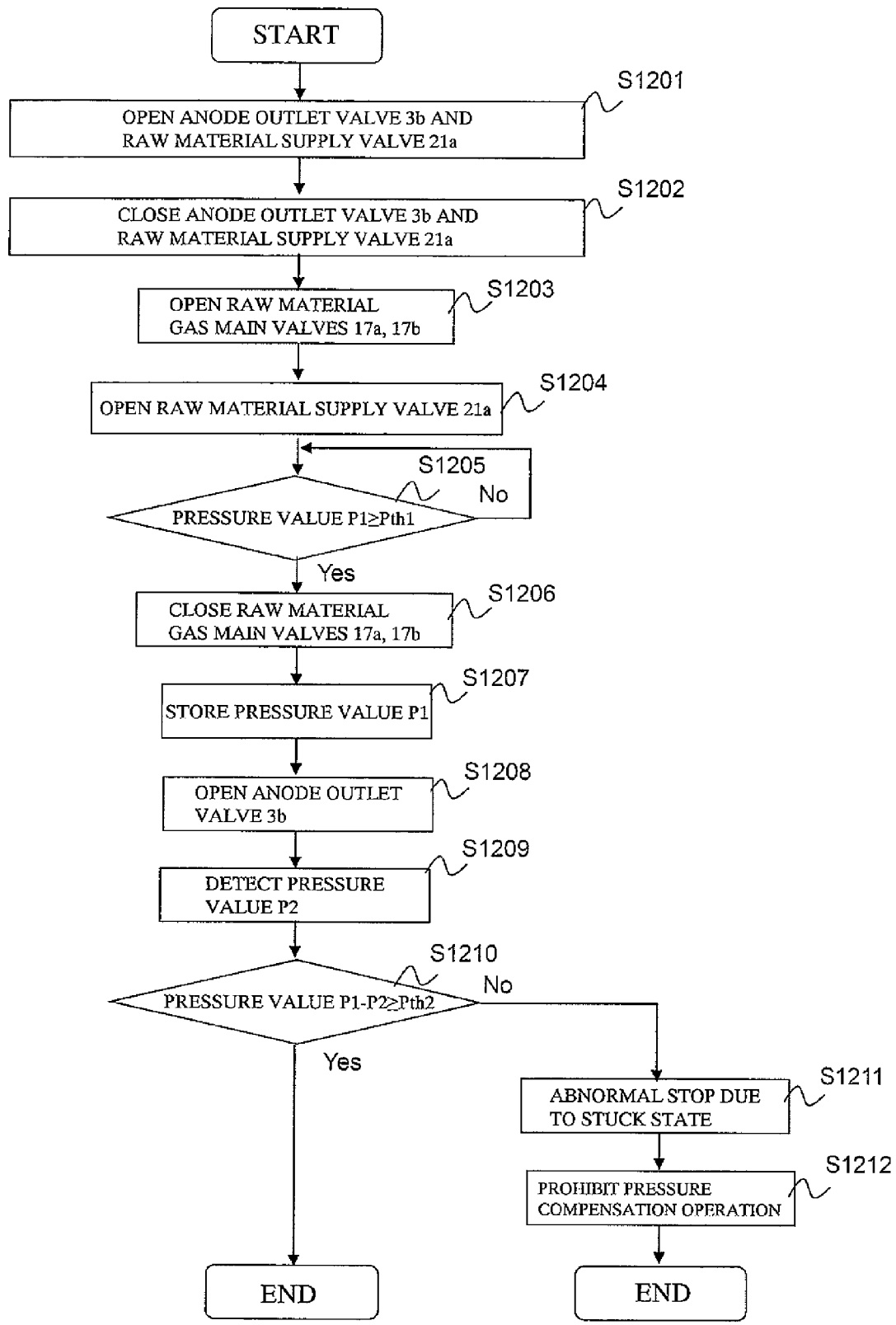
FIG. 5 is a flowchart showing an example of an operation program for the fuel cell system according to Embodiment 2 of the present invention.

FIG. 5 is a flowchart showing an example of a flow of operations which the fuel cell system according to Embodiment 2 of the present invention performs for the stuck-state check.

First, the controller 13 outputs an instruction to start the stuck-state check (START). At this time, the raw material gas main valves 17a and 17b are in a closed state. The controller 13 opens the anode outlet valve 3b and the raw material gas supply valve 21a, so that the combustible gas passage, which is downstream from the deodorizing device 20, becomes open to the atmosphere (step S1201).

Thereafter, the controller 13 closes the anode outlet valve 3b and the raw material gas supply valve 21a (step S1202), and opens the raw material gas main valves 17a and 17b (step S1203).

Subsequently, the controller 13 opens the raw material gas supply valve 21a (step S1204) to supply the raw material gas to the combustible gas passage, and detects the pressure value P1 indicative of the pressure within the raw material gas supply passage 16a by means of the pressure detector 7.

When the pressure value P1 becomes greater than or equal to the first pressure threshold Pth1 (Yes in step S1205), the controller 13 determines that the raw material gas has been injected into the combustible gas passage properly, and then closes the raw material gas main valves 17a and 17b (step S1206). Consequently, the raw material gas is sealed in a passage, of the combustible gas passage, that is upstream from the most downstream closed on-off valve (the anode outlet valve 3b). The controller 13 stores, into its internal memory (not shown), the pressure value P1 that is detected by the pressure detector 7 at a time when it is determined Yes in step S1205 (step S1207).

Subsequently, the controller 13 opens the anode outlet valve 3b (step S1208), so that the combustible gas passage becomes open to the atmosphere. When the first predetermined period (e.g., 30 seconds) has elapsed thereafter, the controller 13 obtains the pressure value P2 indicative of the pressure within the raw material gas supply passage 16a by means of the pressure detector 7 (step S1209). Then, the controller 13 determines whether the difference of the pressure value P2 from the pressure value P1 (i.e., P1−P2) is greater than or equal to the second pressure threshold Pth2 (step S1210). If the pressure difference (P1−P2) is less than the second pressure threshold Pth2 (No in step S1210), it is estimated that the raw material gas is currently undischargeable through the combustible gas passage, and that at least one of the on-off valves provided on the combustible gas passage (in the present embodiment, the anode outlet valve 3b and the raw material gas supply valve 21a) is stuck closed. In this case, the controller 13 determines that there is occurring an abnormal stuck state of at least one on-off valve provided on the combustible gas passage. Then, the controller 13 gives an abnormal stuck state warning, and brings the fuel cell system to an abnormal stop (step S1211). Also, the controller 13 prohibits a pressure compensation operation from being performed on the hydrogen generator 32 thereafter (step S1212), and ends the operation of the stuck-state check on the combustible gas passage (END).

If the difference (P1−P2) is greater than or equal to the second pressure threshold Pth2 (Yes in step S1210), this means that the raw material gas sealed in the combustible gas passage in steps S1203 to S1206 has been discharged to the atmosphere, and it is estimated that all of the on-off valves provided on the combustible gas passage have been opened. Here, the controller 13 determines that there is no abnormal stuck state, and ends the stuck-state check operation (END).

Similarly to Embodiment 1, preferably, the stuck-state check by the fuel cell system of the present embodiment is performed at, at least, one of the following times: when the power generation by the fuel cell system is stopped; and when the fuel cell system is started up. Since the stuck-state check is performed by supplying the raw material gas to the reformer, it is particularly preferred that the stuck-state check is performed when the temperature of the reformer is at a level that does not cause carbon deposition from the raw material gas, and that the stuck-state check is performed at, at least, one of the following times: when the power generation by the fuel cell system is stopped; and when the fuel cell system is started up.

[Variations]

Variations similar to those of Embodiment 1 can be made to Embodiment 2. To be specific, a leak check on the passage, of the combustible gas passage, that is upstream from the most downstream on-off valve (i.e., the anode outlet valve 3b) may be performed after the end of the stuck-state check operation. Also, a leak check on the raw material gas supply valve 21a may be performed after the end of the stuck-state check operation.

[Variations of Embodiment 1, Variations of Embodiment 2, and Variations of Variations of the Embodiments]

In the fuel cell systems according to Embodiment 1, Embodiment 2, and Variations of the Embodiments, it is preferred to cause at least one of a ventilator 11 and the air supply device 31 to operate in at least one of the following checks described above with reference to FIGS. 2A to 2D, FIGS. 3A to 3C, and FIG. 5: the stuck-state check on the on-off valves provided on the combustible gas passage which is downstream from the deodorizing device 20 and which extends through the reformer; the leak check on these on-off valves; and the leak check on the combustible gas passage.

This is because there is a possibility in the above checks that a combustible gas is discharged to the outside of the gas passage or into the combustor. If gas dilution is performed by means of the ventilator 11 or the air supply device 31, the combustible gas is diluted and discharged. This improves safety.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structures and/or functional details may be substantially modified without departing from the spirit of the present invention.

INDUSTRIAL APPLICABILITY

The fuel cell system according to the present invention is useful since the fuel cell system is capable of checking, without additionally requiring test gas supply equipment, whether the on-off valves provided on the combustible gas passage, which is downstream from the deodorizing device and which extends through the reformer, are stuck closed.

REFERENCE SIGNS LIST 1 fuel cell
2 fuel gas passage
3a anode inlet valve
3b anode outlet valve
5 fuel gas source
6a, 6b fuel gas supply valve
7 pressure detector
8 oxidizing gas passage
10 oxidizing gas supply device
11 ventilator
12 casing
13 controller
16a raw material gas supply passage
16b raw material gas branch passage
17a, 17b raw material gas main valve
18 raw material gas supply device
20 deodorizing device
21a, 21b raw material gas supply valve
22 water supply passage
23 water tank
24 water pump
25 purifier
26 water supply valve
27 bypass passage
28 bypass valve
29 burner-front valve
30 combustor
31 air supply device
32 hydrogen generator
32a reformer
32b evaporator
33 exhaust hydrogen gas passage
100 fuel cell system

The invention claimed is:

1. A method for operating a fuel cell system, comprising:
removing, by a deodorizing device, an odor component contained in a raw material gas; generating, by a reformer, a hydrogen-containing gas through a reforming reaction using the raw material gas that has passed through the deodorizing device;
generating power, by a fuel cell, using the hydrogen-containing gas that is discharged from the reformer;
performing a stuck-state check on at least one on-off valve provided on a combustible gas passage which is downstream from the deodorizing device and which extends through the reformer, by supplying the raw material gas to the combustible gas passage;
ventilating the inside of a casing when performing the stuck-state check, the casing accommodating at least the deodorizing device, the fuel cell, the reformer and the combustible gas passage; and
prohibiting a pressure compensation operation, which is an operation to supply the raw material gas into the reformer in association with a temperature decrease in the reformer, from being performed on the reformer if an abnormality is detected in at least one of the stuck-state check and a leak check performed on the combustible gas passage after the stuck-state check is performed.

2. A method for operating a fuel cell system, comprising:
removing, by a deodorizing device, an odor component contained in a raw material gas;
generating, by a reformer, a hydrogen-containing gas through a reforming reaction using the raw material gas that has passed through the deodorizing device;
generating power, by a fuel cell, using the hydrogen-containing gas that is discharged from the reformer;
performing a stuck-state check on at least one on-off valve provided on a combustible gas passage which is downstream from the deodorizing device and which extends through the reformer, by supplying the raw material gas to the combustible gas passage;
heating the reformer using a combustor connected to the combustible gas passage; and
supplying air to the combustor using a combustion fan, wherein
the combustion fan is operated when performing the stuck-state check and the combustor is not operated when performing the stuck-state check; and
prohibiting a pressure compensation operation, which is an operation to supply the raw material gas into the reformer in association with a temperature decrease in the reformer, from being performed on the reformer if an abnormality is detected in at least one of the stuck-state check and a leak check performed on the combustible gas passage after the stuck-state check is performed.

3. A method for operating a fuel cell system, comprising:
removing, by a deodorizing device, an odor component contained in a raw material gas;
generating, by a reformer, a hydrogen-containing gas through a reforming reaction using the raw material gas that has passed through the deodorizing device;
generating power, by a fuel cell, using the hydrogen-containing gas that is discharged from the reformer;
performing a stuck-state check on at least one on-off valve provided on a combustible gas passage which is downstream from the deodorizing device and which extends through the reformer, by supplying the raw material gas to the combustible gas passage; and
prohibiting a pressure compensation operation, which is an operation to supply the raw material gas into the reformer in association with a temperature decrease in the reformer, from being performed on the reformer if an abnormality is detected in at least one of the stuck-state check and a leak check performed on the combustible gas passage after the stuck-state check is performed.

4. A method for operating a fuel cell system, comprising:
removing, by a deodorizing device, an odor component contained in a raw material gas;
generating, by a reformer, a hydrogen-containing gas through a reforming reaction using the raw material gas that has passed through the deodorizing device;

generating power, by a fuel cell, using the hydrogen-containing gas that is discharged from the reformer;
performing a stuck-state check on at least one on-off valve provided on a combustible gas passage which is downstream from the deodorizing device and which extends through the reformer, by supplying the raw material gas to the combustible gas passage; and
prohibiting a pressure compensation operation, which is an operation to supply the raw material gas into the reformer in association with a temperature decrease in the reformer, from being performed on the reformer if an abnormality is detected in the stuck-state check.

5. A method for operating a fuel cell system, comprising:
removing, by a deodorizing device, an odor component contained in a raw material gas;
generating, by a reformer, a hydrogen-containing gas through a reforming reaction using the raw material gas that has passed through the deodorizing device;
generating power, by a fuel cell, using the hydrogen-containing gas that is discharged from the reformer;
performing a stuck-state check on at least one on-off valve provided on a combustible gas passage which is downstream from the deodorizing device and which extends through the reformer, by supplying the raw material gas to the combustible gas passage;
causing the combustible gas passage to communicate with the atmosphere by opening an on-off valve provided on the combustible gas passage;
closing all of the on-off valves after causing the combustible gas passage to communicate with the atmosphere, and thereafter, sequentially opening the on-off valves from an upstream on-off valve while supplying the raw material gas to the combustible gas passage;
performing the stuck-state check based on a pressure difference between before and after the most downstream on-off valve is opened; and
prohibiting a pressure compensation operation, which is an operation to supply the raw material gas into the reformer in association with a temperature decrease in the reformer, from being performed on the reformer if an abnormality is detected in at least one of the stuck-state check and a leak check performed on the combustible gas passage after the stuck-state check is performed.

6. A method for operating a fuel cell system, comprising:
removing, by a deodorizing device, an odor component contained in a raw material gas;
generating, by a reformer, a hydrogen-containing gas through a reforming reaction using the raw material gas that has passed through the deodorizing device;
generating power, by a fuel cell, using the hydrogen-containing gas that is discharged from the reformer;
performing a stuck-state check on at least one on-off valve provided on a combustible gas passage which is downstream from the deodorizing device and which extends through the reformer, by supplying the raw material gas to the combustible gas passage;
causing the combustible gas passage to communicate with the atmosphere by opening an on-off valve provided on the combustible gas passage; and
prohibiting a pressure compensation operation, which is an operation to supply the raw material gas into the reformer in association with a temperature decrease in the reformer, from being performed on the reformer if an abnormality is detected in at least one of the stuck-state check and a leak check performed on the combustible gas passage after the stuck-state check is performed,
wherein:
the at least one on-off valve includes a first on-off valve which is provided upstream from the reformer and a second on-off valve which is provided downstream from the reformer, and
the second on-off valve is opened prior to the first on-off valve when causing the combustible gas passage to communicate with the atmosphere when performing the stuck-state check.

7. A method for operating a fuel cell system, comprising:
removing, by a deodorizing device, an odor component contained in a raw material gas;
generating, by a reformer, a hydrogen-containing gas through a reforming reaction using the raw material gas that has passed through the deodorizing device;
generating power, by a fuel cell, using the hydrogen-containing gas that is discharged from the reformer;
performing a stuck-state check on at least one on-off valve provided on a combustible gas passage which is downstream from the deodorizing device and which extends through the reformer, by supplying the raw material gas to the combustible gas passage;
heating the reformer using a combustor connected to the combustible gas passage; and
prohibiting a pressure compensation operation, which is an operation to supply the raw material gas into the reformer in association with a temperature decrease in the reformer, from being performed on the reformer if an abnormality is detected in at least one of the stuck-state check and a leak check performed on the combustible gas passage after the stuck-state check is performed,
wherein:
the combustible gas passage includes a first passage which extends through the reformer to the combustor while bypassing the fuel cell, and a second passage which extends through the reformer and the fuel cell to the combustor, and
the stuck-state check is performed on the on-off valve that is provided on the second passage after performing the stuck-state check on the on-off valve that is provided on the first passage.

* * * * *